US009569012B2

(12) United States Patent
Kabasawa et al.

(10) Patent No.: US 9,569,012 B2
(45) Date of Patent: *Feb. 14, 2017

(54) INPUT APPARATUS, CONTROL APPARATUS, AND CONTROL METHOD FOR INPUT APPARATUS

(71) Applicant: Sony Corporation, Tokyo (JP)

(72) Inventors: Hidetoshi Kabasawa, Saitama (JP); Kazuyuki Yamamoto, Kanagawa (JP); Toshio Mamiya, Tokyo (JP); Yoshiyuki Fuchigami, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,019

(22) Filed: Feb. 11, 2015

(65) Prior Publication Data
US 2015/0220165 A1 Aug. 6, 2015

Related U.S. Application Data

(63) Continuation of application No. 12/645,642, filed on Dec. 23, 2009, now Pat. No. 8,982,048.

(30) Foreign Application Priority Data

Dec. 24, 2008 (JP) ................. 2008-327698

(51) Int. Cl.
G06F 3/0346 (2013.01)
G06F 3/038 (2013.01)
(52) U.S. Cl.
CPC .......... G06F 3/0346 (2013.01); G06F 3/0383 (2013.01); G06F 2203/0383 (2013.01); G06F 2203/0384 (2013.01)

(58) Field of Classification Search
CPC .................. G06F 3/0346; G06F 3/0383; G06F 2203/0384; G06F 2203/0383
See application file for complete search history.

(56) References Cited

U.S. PATENT DOCUMENTS 6,729,731 B2 5/2004 Gnanamgari et al.
8,413,077 B2 4/2013 Yamamoto et al.
(Continued)

FOREIGN PATENT DOCUMENTS

JP 6-007371 1/1994

OTHER PUBLICATIONS

U.S. Appl. No. 12/606,484, filed Oct. 27, 2009, Yamamoto.
(Continued)

Primary Examiner — Latanya Bibbins
(74) Attorney, Agent, or Firm — Wolf, Greenfield & Sacks, P.C.

(57) ABSTRACT

An input apparatus capable of transmitting a signal corresponding to an operation of a user to a control apparatus capable of switching display among a plurality of display screens, includes a first detection section, a second detection section, and a mode switch section. The first detection section detects analog information on a movement of the input apparatus made by the user. The second detection section detects digital information input by the user. The mode switch section makes a switch between a first mode for transmitting to the control apparatus a first signal that is based on the analog information detected by the first detection means and a second mode for transmitting to the control apparatus a second signal that is based on the digital information detected by the second detection means, in association with the display screen displayed on the control apparatus.

13 Claims, 15 Drawing Sheets

(56) References Cited

U.S. PATENT DOCUMENTS

| | | | |
|---|---|---|---|
| 8,648,798 B2 | 2/2014 | Yamamoto | |
| 8,982,048 B2 | 3/2015 | Kabasawa et al. | |
| 9,152,246 B2 | 10/2015 | Sawai et al. | |
| 2005/0216867 A1* | 9/2005 | Marvit | G06F 1/1613 715/863 |
| 2009/0048021 A1* | 2/2009 | Lian | A63F 13/06 463/37 |
| 2009/0258706 A1 | 10/2009 | Rofougaran et al. | |
| 2009/0303204 A1* | 12/2009 | Nasiri | A63F 13/06 345/184 |
| 2010/0079500 A1* | 4/2010 | O'Sullivan | G06F 3/038 345/661 |
| 2010/0110001 A1 | 5/2010 | Yamamoto | |
| 2010/0156786 A1 | 6/2010 | Kabasawa et al. | |
| 2010/0169824 A1 | 7/2010 | Sawai et al. | |
| 2010/0169843 A1 | 7/2010 | Yamamoto et al. | |
| 2014/0195016 A1 | 7/2014 | Yamamoto | |
| 2015/0169160 A1 | 6/2015 | Sawai et al. | |
| 2016/0098102 A1 | 4/2016 | Yamamoto | |

OTHER PUBLICATIONS

U.S. Appl. No. 12/645,642, filed Dec. 23, 2009, Kabasawa et al.
U.S. Appl. No. 14/151,667, filed Jan. 9, 2014, Yamamoto.
U.S. Appl. No. 12/644,638, filed Dec. 22, 2009, Yamamoto et al.
U.S. Appl. No. 12/645,732, filed Dec. 23, 2009, Sawai et al.
U.S. Appl. No. 14/572,884, filed Dec. 17, 2014, Sawai et al.
U.S. Appl. No. 14/878,392, filed Oct. 8, 2015, Yamamoto.

* cited by examiner

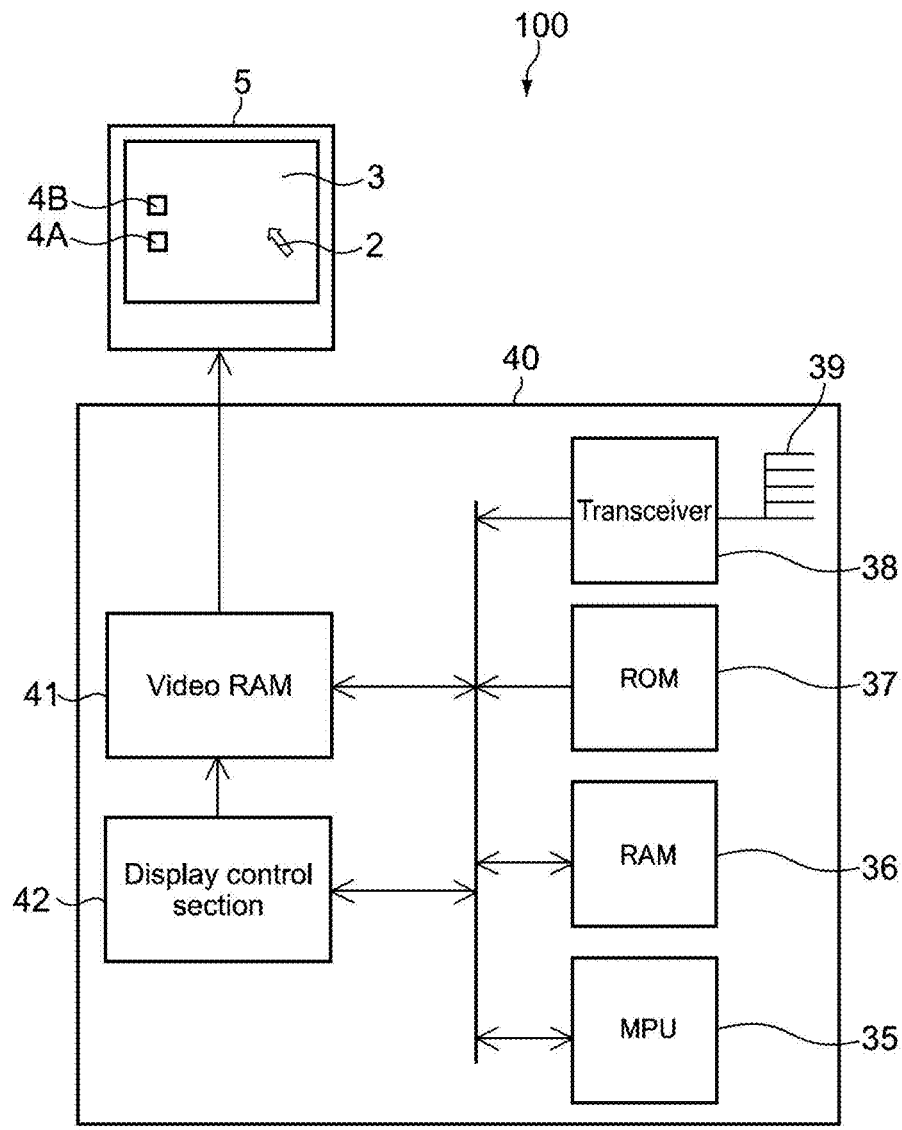
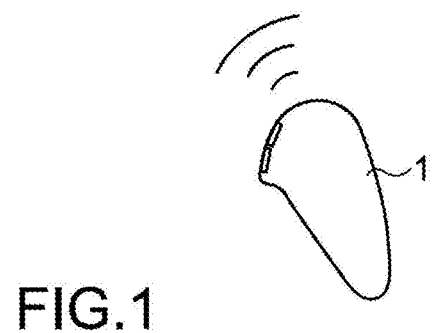
FIG.1

INPUT APPARATUS, CONTROL APPARATUS, AND CONTROL METHOD FOR INPUT APPARATUS

RELATED APPLICATIONS

This application is a continuation of U.S. patent application Ser. No. 12/645,642, entitled "INPUT APPARATUS, CONTROL APPARATUS, AND CONTROL METHOD FOR INPUT APPARATUS," filed Dec. 23, 2009, which claims priority to Japanese Patent Application No. 2008-327698, filed Dec. 24, 2008. Each of the documents listed above is incorporated herein by reference in its entirety.

BACKGROUND OF THE INVENTION

1. Field of the Invention

The present invention relates to an input apparatus such as a 3-dimensional operation pointing device, a 3-dimensional operation remote controller, and a cellular phone, a control apparatus capable of receiving a signal from the input apparatus, and a control method for an input apparatus.

2. Description of the Related Art

Pointing devices, particularly a mouse and a touchpad, are used as controllers for GUIs (Graphical User Interfaces) widely used in PCs (Personal Computers).

Not just as HIs (Human Interfaces) of PCs of the related art, the GUIs are now starting to be used as interfaces for AV equipment used in living rooms with televisions as image media. Examples of the HI of this type include a cross media bar, an EPG, an IP-TV, and Windows Media Center.

As the HIs currently in wide use, there are remote controllers with arrow keys as extensions of remote controllers for AV equipment of the related art, for controlling the GUIs, but the operability thereof is poor since it is difficult to perform a free cursor operation.

To solve such a problem, a wireless mouse or the like may be used, but a table or the like to place the mouse may become necessary for operating the mouse.

Japanese Examined Patent Publication No. Hei 6-7371 (claims 1 and 2) (hereinafter, referred to as Patent Document 1) discloses "a 3-dimensional computer input apparatus performing 3-dimensional inputs to a computer, characterized by comprising: a direction sensing means for sensing changes in directions in space along three rotation axes (pitch, roll, and yaw); a displacement sensing means for sensing displacements along axes of at least a two-dimensional coordinate system out of an XYZ coordinate system set in a main body of the 3-dimensional computer input apparatus; and an electronic circuit connected to an input port of the computer, to convert output signals of the direction sensing means and the displacement sensing means so that the signals can be processed by the computer, and in that the direction sensing means is constituted of three gyroscopes corresponding to the three rotation axes (pitch, roll, and yaw), respectively, and the displacement sensing means is constituted of at least two acceleration sensors each corresponding to any of the XYZ axes". Accordingly, unlike the mouse, a table or the like becomes unnecessary, and operations in the air become possible.

In the past, a 3-dimensional mouse capable of being operated in the air has calculated a movement amount of a cursor on a PC (Personal Computer) screen from a complex movement of a hand that moves 3-dimensionally. Therefore, the 3-dimensional mouse may need to be equipped with sensors such as an acceleration sensor and an angular velocity sensor for detecting the hand movement (Patent Document 1).

SUMMARY OF THE INVENTION

However, because the 3-dimensional mouse as described in Patent Document 1 is equipped with many devices that consume more electric power than in a desktop wireless mouse, it has been difficult to suppress power consumption of the entire mouse and also prolong a battery life. An infrared sensor of the desktop wireless mouse only needs to detect values when the mouse is moving, but the acceleration sensor and the angular velocity sensor of the 3-dimensional mouse need to constantly detect values. Moreover, a relatively-large current flows into those sensors, and hence more delicate power consumption control than the desktop wireless mouse is desirable.

Pointing devices that are operated in the air as described above are expected to be used wirelessly from now on as a mainstream.

The inventors of the present invention have found a new problem that since the number of sensors becomes large in the pointing device that is operated in the air as described in Patent Document 1, electric power consumed increases when trying to use it wirelessly.

In view of the above-mentioned circumstances, there is a need for an input apparatus, a control apparatus, and a control method for an input apparatus that are capable of reducing power consumption.

According to an embodiment of the present invention, there is provided an input apparatus capable of transmitting a signal corresponding to an operation by a user to a control apparatus capable of switching display among a plurality of display screens, including a first detection means, a second detection means, and a mode switch means. The first detection means detects analog information on a movement of the input apparatus made by the user. The second detection means detects digital information input by the user. The mode switch means makes a switch between a first mode for transmitting to the control apparatus a first signal that is based on the analog information detected by the first detection means and a second mode for transmitting to the control apparatus a second signal that is based on the digital information detected by the second detection means, in association with the display screen displayed on the control apparatus.

In the input apparatus according to the embodiment of the present invention, the mode switch means makes a switch between the first mode for transmitting to the control apparatus the first signal that is based on the analog information and the second mode for transmitting to the control apparatus the second signal that is based on the digital information, in association with the display screen displayed on the control apparatus. As a result, by switching the first mode to the second mode, it may become unnecessary to detect analog information by the first detection means, with the result that power consumption can be reduced in the first detection means and power consumption of the input apparatus can thus be reduced.

The mode switch means may make a switch between the first mode and the second mode in response to a first mode switch command transmitted to the input apparatus from the control apparatus.

With this structure, a mode of the input apparatus can be switched.

The mode switch means may control on/off of an operation of the first detection means.

With this structure, it becomes possible to switch off the operation of the first detection means when analog information is not required and thus save power.

The first detection means may include a plurality of detection sections whose operations can be controlled individually to be turned on/off, and the mode switch means may individually control on/off of the operations of the plurality of detection sections.

With this structure, it is possible to switch off the operation of the detection sections when analog information is not required and thus save power stepwise.

The input apparatus may further include an operation circuit to perform a predetermined operation based on the analog information, and the mode switch means may switch an operation frequency of the operation circuit.

With this structure, it is possible to switch the operation frequency of the operation circuit when analog information is not required and thus save power.

The mode switch means may switch the operation frequency of the operation circuit from a first value to a second value smaller than the first value in accordance with a switch from the first mode to the second mode, and switch the operation frequency of the operation circuit from the second value to the first value in accordance with a switch from the second mode to the first mode.

With this structure, it is possible to switch the operation frequency of the operation circuit when analog information is not required or when required and thus save power.

The input apparatus may further include a transmission means whose data transfer rate can be switched, and the mode switch means may switch the data transfer rate of the transmission means.

With this structure, it is possible to switch the data transfer rate of the transmission means when analog information is not required and thus save power.

The mode switch means may switch the data transfer rate of the transmission means from a first value to a second value smaller than the first value in accordance with a switch from the first mode to the second mode, and switch the data transfer rate of the transmission means from the second value to the first value in accordance with a switch from the second mode to the first mode.

With this structure, it is possible to switch the data transfer rate of the input apparatus when analog information is not required or when required and thus save power.

The mode switch means may make a switch between the first mode and the second mode in response to a second mode switch command input by the user, and transmit to the control apparatus a signal for making a switch between a first display screen corresponding to the first mode and a second display screen corresponding to the second mode.

With this structure, by the user operating the input apparatus, modes of the input apparatus and the control apparatus can be switched.

According to an embodiment of the present invention, there is provided a control apparatus including a reception means and a screen switch means. The reception means receives a first signal that is based on analog information on a movement of an input apparatus made by a user and a second signal that is based on digital information input to the input apparatus by the user. The screen switch means makes a switch between a first display screen corresponding to a first mode for carrying out processing of the first signal received by the reception means and a second display screen corresponding to a second mode for carrying out processing of the second signal received by the reception means.

In the embodiment of the present invention, the screen switch means makes a switch between the first display screen corresponding to the first mode for carrying out processing based on the first signal received by the reception means and the second display screen corresponding to the second mode for carrying out processing based on the second signal received by the reception means. By switching the first display screen to the second display screen, it may become unnecessary to receive the first signal containing the analog information. In other words, since analog information does not need to be detected, power consumption of the input apparatus can be reduced.

The control apparatus may further include a transmission means for transmitting to the input apparatus a mode switch command for switching a mode of the input apparatus in association with a mode of one of the first display screen and the second display screen that is being displayed.

With this structure, the mode of the input apparatus can be switched in accordance with the switch between the first display screen and the second display screen.

The screen switch means may make a switch between the first display screen and the second display screen in response to a third mode switch command transmitted from the input apparatus.

With this structure, it is possible to switch the mode of the control apparatus in accordance with the third mode switch command transmitted from the input apparatus by the operation of the user.

According to an embodiment of the present invention, there is provided a control method for an input apparatus capable of transmitting a signal corresponding to an operation by a user to a control apparatus capable of switching display among a plurality of display screens, the method including: detecting analog information on a movement of the input apparatus made by the user; detecting digital information input by the user; and making a switch between a first mode for transmitting to the control apparatus a first signal that is based on the detected analog information and a second mode for transmitting to the control apparatus a second signal that is based on the detected digital information, in association with the display screen displayed on the control apparatus.

In the embodiment of the present invention, a switch is made between the first mode for transmitting to the control apparatus the first signal that is based on the analog information and the second mode for transmitting to the control apparatus the second signal that is based on the digital information, in association with the display screen displayed on the control apparatus. As a result, by switching the first mode to the second mode, it may become unnecessary to detect analog information, with the result that power consumption can be reduced in the detection and power consumption of an input apparatus can thus be reduced.

According to an embodiment of the present invention, there is provided an input apparatus capable of transmitting a signal corresponding to an operation of a user to a control apparatus capable of switching display among a plurality of display screens, including a first detection section, a second detection section, and a mode switch section. The first detection section detects analog information on a movement of the input apparatus made by the user. The second detection section detects digital information input by the user. The mode switch section makes a switch between a first mode for transmitting to the control apparatus a first signal that is based on the analog information detected by the first detection section and a second mode for transmitting to the control apparatus a second signal that is based on the digital information detected by the second detection section, in association with the display screen displayed on the control apparatus.

According to an embodiment of the present invention, there is provided a control apparatus including a reception section and a screen switch section. The reception section receives a first signal that is based on analog information on a movement of an input apparatus made by a user and a second signal that is based on digital information input to the input apparatus by the user. The screen switch section makes a switch between a first display screen corresponding to a first mode for carrying out processing of the first signal received by the reception section and a second display screen corresponding to a second mode for carrying out processing of the second signal received by the reception section.

As described above, according to the embodiments of the present invention, power consumption of the input apparatus can be reduced.

These and other objects, features and advantages of the present invention will become more apparent in light of the following detailed description of best mode embodiments thereof, as illustrated in the accompanying drawings.

BRIEF DESCRIPTION OF DRAWINGS

FIG. 1 is a diagram showing a control system according to an embodiment of the present invention;

DESCRIPTION OF PREFERRED EMBODIMENTS

Figure 2:
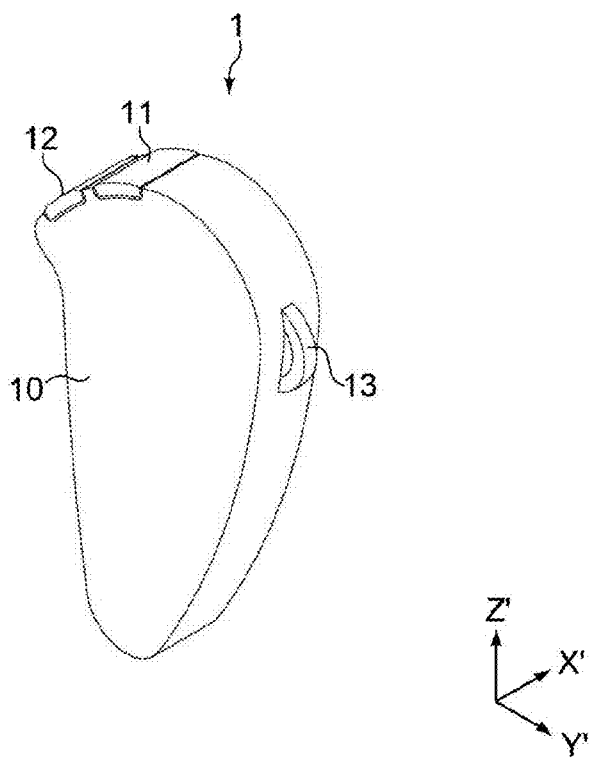
FIG. 2 is a perspective diagram showing an input apparatus.

Hereinafter, embodiments of the present invention will be described with reference to the drawings.

(Structure of Control System)

FIG. 1 is a diagram showing a control system according to an embodiment of the present invention. A control system 100 includes a display apparatus 5, a control apparatus 40, and an input apparatus 1.

(Control Apparatus 40)

As shown in FIG. 1, the control apparatus 40 includes an MPU 35 (or CPU), a RAM 36, a ROM (Read-Only Memory) 37, a transceiver 38, an antenna 39, a video RAM 41, and a display control section 42.

The transceiver 38 receives a control signal transmitted from the input apparatus 1 via the antenna 39. The transceiver 38 also has a transmitting function and is capable of performing two-way communication with the input apparatus 1. The transceiver 38 is detachable from the control apparatus 40, for example.

The MPU 35 performs, based on the control signal, an operation for controlling a movement of a pointer (cursor) 2 displayed on a screen 3 of the display apparatus 5 or an operation for controlling execution of an icon 4. Accordingly, a display control signal for controlling a UI displayed on the screen 3 of the display apparatus 5 is generated.

The ROM 37 stores a table that shows a correspondence between graphics of the icons 4 and the like displayed on the screen 3 of the display apparatus 5 and cursor modes of the cursor 2 to be described later (free mode or non-free mode). In other words, a free mode is stored in association with an icon 4A and a non-free mode is stored in association with an icon 4B, for example.

The display control section 42 mainly generates screen data to be displayed on the screen 3 of the display apparatus 5 under control of the MPU 35. The video RAM 41 stores the screen data generated in response to the display control signal, that is to be displayed on the display apparatus 5.

The control apparatus 40 may be an apparatus dedicated to the input apparatus 1, or may be a personal computer (PC) or the like. The control apparatus 40 is not limited to the apparatus dedicated to the input apparatus 1, and may be a computer integrally formed with the display apparatus 5, an audio/visual equipment, a projector, a game device, a television receiver, a car navigation device, or the like.

(Input Apparatus 1)

FIG. 2 is a perspective diagram showing the input apparatus 1. The input apparatus 1 is a 3-dimensional pointing device used for inputting information to the display apparatus 5. The input apparatus 1 is of a size that a user is capable of holding (handheld). As shown in FIG. 2, the input apparatus 1 includes a casing 10 and operation sections such as three buttons 11, 12, and 13 provided at an upper portion of the casing 10.

The button 11 is provided closer to the center of the upper portion of the casing 10 and functions as, for example, a left button of a mouse as an input device for a PC. A file is executed by double-clicking the button 11. A "drag and drop" operation can be performed by moving the input apparatus while press-and-holding the button 11.

The button 12 is adjacent to the button 11 and functions as a right button of a mouse. Various option operations can be made, for example.

The button 13 is a button used for switching effectiveness/ineffectiveness of a function of recognizing a movement of the input apparatus 1 and the like. The button 13 is a rotatable button and can scroll the screen by its rotation.

A button 23 (see FIG. 7) such as an XMB (registered trademark) button is a push button that is capable of being pressed by the user, for example. The button 23 is used for the user to intentionally change operation modes (cursor modes) of the input apparatus 1 and the control apparatus 40 to be described later from a free mode (free cursor mode) to a non-free mode (non-free cursor mode) to be described later and vice versa.

Locations of the buttons 11, 12, 13, and 23, a content of a command issued, and the like can arbitrarily be changed.

Figure 3:
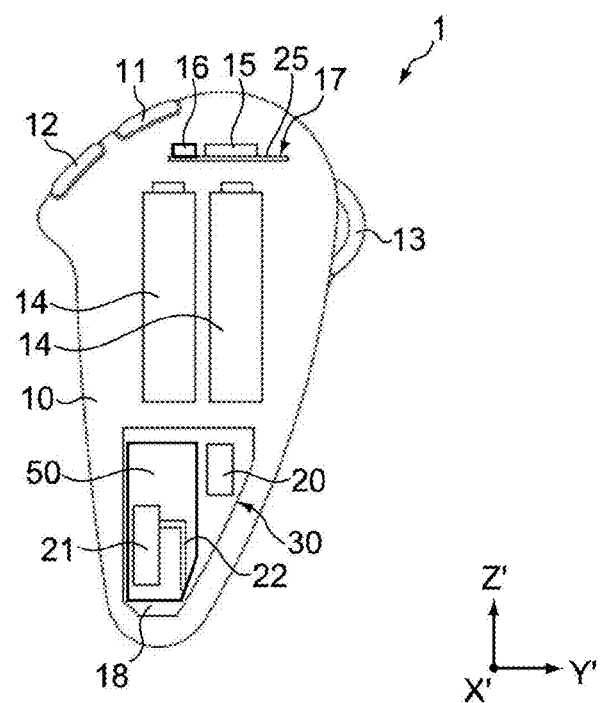
FIG. 3 is a diagram schematically showing an internal structure of the input apparatus.

FIG. 3 is a diagram schematically showing an internal structure of the input apparatus 1. In descriptions given with reference to FIGS. 2 and 3, a longitudinal direction of the casing 10 is referred to as Z' direction, a thickness direction of the casing 10 is referred to as X' direction, and a width direction of the casing 10 is referred to as Y' direction for convenience.

As shown in FIG. 3, the input apparatus 1 includes a control unit 30, a sensor unit 17, and batteries 14.

The control unit 30 includes a main substrate 18, an MPU 50 (Micro Processing Unit) (or CPU) mounted on the main substrate 18, a crystal oscillator 20, a transceiver 21, and an antenna 22 printed on the main substrate 18.

Figure 4:
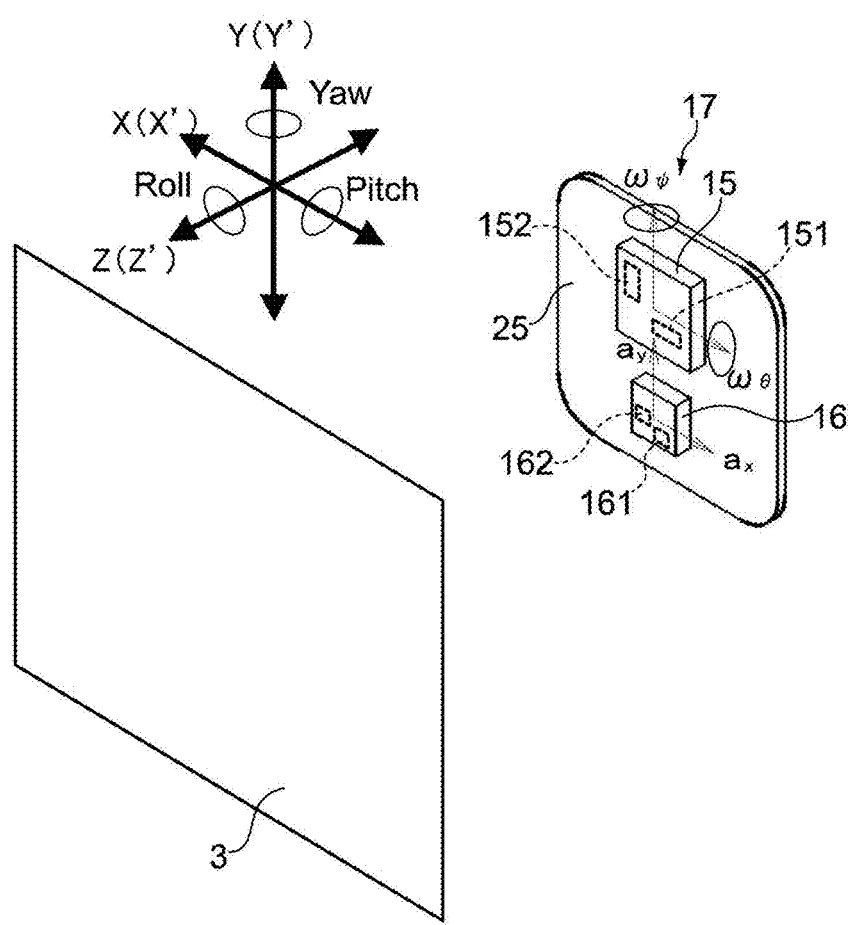
FIG. 4 A perspective diagram showing a sensor unit.

FIG. 4 is a perspective diagram showing the sensor unit 17. The sensor unit 17 includes a circuit board 25, an angular velocity sensor (gyro sensor) unit 15, and an acceleration sensor unit 16 (first detection means).

The angular velocity sensor (gyro sensor) unit 15 detects angular velocities about two axes crossing each other, that is, two orthogonal axes, for example. The acceleration sensor unit 16 detects accelerations along two axes crossing each other, that is, two orthogonal axes (X' axis and Y' axis), for example. It should be noted that the detection axes of the angular velocity sensor unit 15 and detection axes of the acceleration sensor unit 16 are not necessarily the same, and may be disposed at angles at which the detection axes cross each other.

The angular velocity sensor unit 15 includes two sensors, that is, a first angular velocity sensor 151 and a second angular velocity sensor 152. The acceleration sensor unit 16 includes two sensors, that is, a first acceleration sensor 161 and a second acceleration sensor 162. Moreover, the angular velocity sensor unit 15 and the acceleration sensor unit 16 are packaged and mounted on the circuit board 25.

As each of the first and second angular velocity sensors 151 and 152, a vibration gyro sensor for detecting Coriolis force proportional to an angular velocity is used. As each of the first and second acceleration sensors 161 and 162, any sensor such as a piezoresistive sensor, a piezoelectric sensor, and a capacitance sensor may be used.

The sensor unit 17 is incorporated into the casing 10 such that a surface of the circuit board 25 on which the angular velocity sensor unit 15 and the acceleration sensor unit 16 are mounted is substantially in parallel with an X'-Y' plane, and the sensor units 15 and 16 each detect physical amounts with respect to the two axes, that is, the X' axis and the Y' axis. In descriptions below, a coordinate system that moves along with the input apparatus 1, that is, a coordinate system fixed to the input apparatus 1 is expressed using the X' axis, Y' axis, and Z' axis, whereas a coordinate system stationary on earth, that is, an inertial coordinate system is expressed using the X axis, Y axis, and Z axis. Moreover, in descriptions below, with regard to a movement of the input apparatus 1, a rotational direction about the X' axis is sometimes referred to as pitch direction, a rotational direction about the Y' axis is sometimes referred to as yaw direction, and a rotational direction about the Z' axis (roll axis) is sometimes referred to as roll direction.

Figure 5:
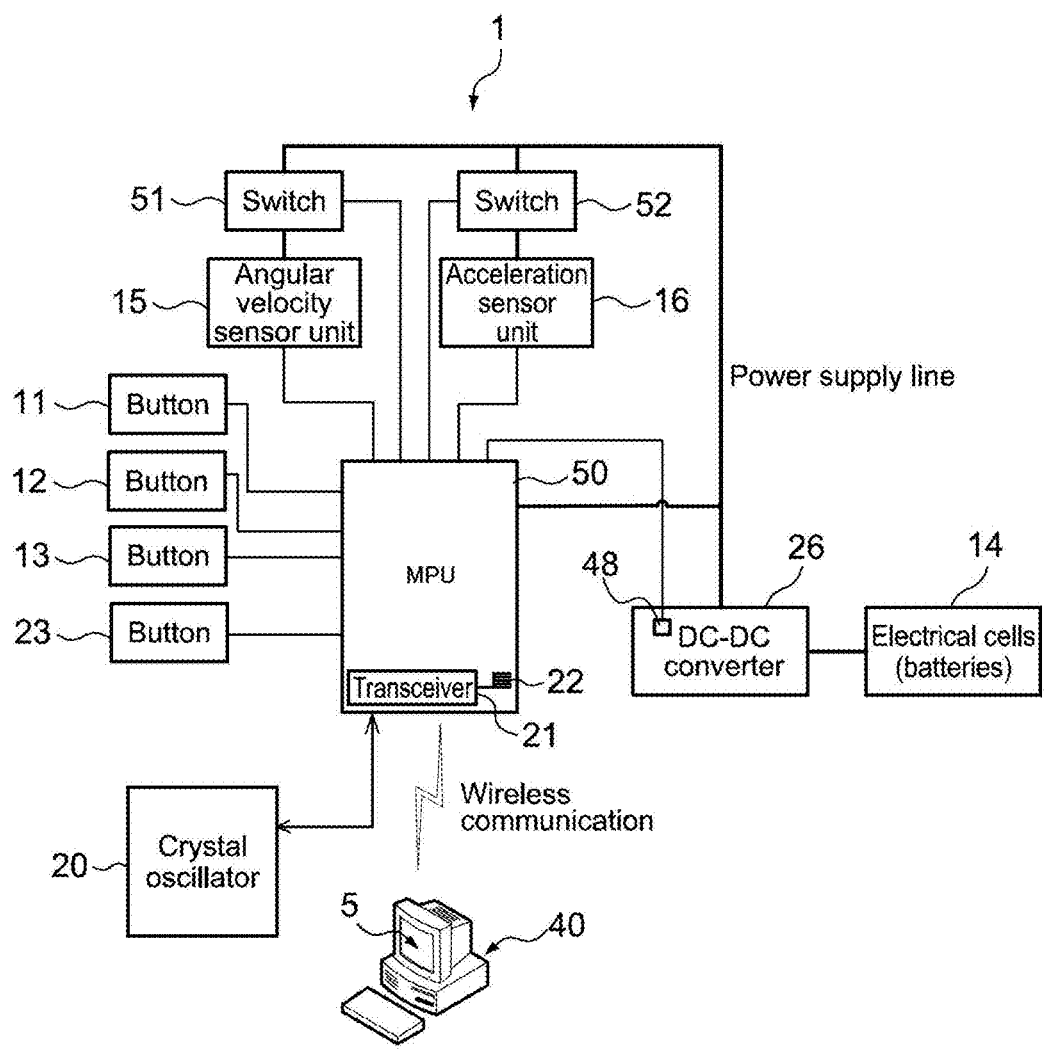
FIG. 5 is a block diagram showing an electrical structure of the input apparatus.

FIG. 5 is a block diagram showing an electrical structure of the input apparatus 1. As shown in the figure, the input apparatus 1 includes the buttons 11, 12, 13, and 23, the angular velocity sensor unit 15, the acceleration sensor unit 16, the MPU 50, switches 51 and 52, the crystal oscillator 20, a DC-DC converter 26, and electrical cells (batteries) 14.

The input apparatus 1 is powered by the batteries 14. As the batteries 14, dry cell batteries, rechargeable batteries, or the like are used.

The DC-DC converter 26 supplies power to the angular velocity sensor unit 15, the acceleration sensor unit 16, and the MPU 50 while keeping power supply voltages of the batteries 14 at a constant voltage. The DC-DC converter 26 includes a shutdown switch 48. The shutdown switch 48 is a switch for turning off the power supply to the entire system of the input apparatus 1.

The crystal oscillator 20 generates clocks and supplies them to the MPU 50.

Based on detection signals of the angular velocity sensor unit 15 and the acceleration sensor unit 16, the MPU 50 calculates velocity values. The MPU 50 manages input signals from the buttons 11, 12, 13, and 23.

The MPU 50 executes operation modes of the angular velocity sensor unit 15, the acceleration sensor unit 16, and the MPU 50 itself in response to mode change commands (commands for shifting operation modes) to be described later. The MPU 50 switches on/off of the switch 51 and the switch 52 according to the operation mode to be executed. When the switch 51 is on, power is supplied to the angular velocity sensor unit 15 from the DC-DC converter 26, and when the switch 51 is off, supply of power is cut off. When the switch 52 is on, power is supplied to the acceleration sensor unit 16 from the DC-DC converter 26, and when the switch 52 is off, supply of power is cut off. It should be noted that the switch 51 may be incorporated into the angular velocity sensor unit 15, or the switch 52 may be incorporated into the acceleration sensor unit 16.

The MPU 50 outputs a power off command to the shutdown switch 48 based on a predetermined command and turns off power supply to the entire system of the input apparatus 1.

The MPU 50 judges a usage mode of the input apparatus 1 based on detection signals from the angular velocity sensor unit 15 and the acceleration sensor unit 16 and input signals from the buttons 11, 12, 13, and 23. In other words, based on the calculated velocity values and the signals from the buttons 11, 12, 13, and 23, the MPU 50 makes a judgment between a first mode in which the input apparatus 1 is being operated and a second mode in which the input apparatus 1 is not operated.

Based on a result of the judgment, the MPU 50 shifts an operation mode of the MPU 50 itself.

The MPU 50 outputs the velocity values and the signals from the buttons 11, 12, 13, and 23 as RF radio signals to the control apparatus 40 via the antenna 22 by means of the transceiver 21. The transceiver 21 also functions as a receiver for receiving signals transmitted from the control apparatus 40.

Figure 6:
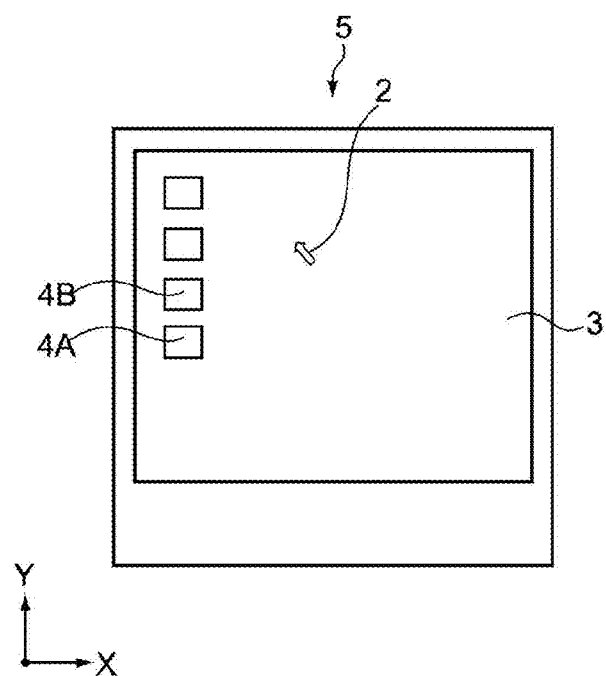
FIG. 6 is a diagram showing an example of a screen displayed on a display apparatus.

FIG. 6 is a diagram showing an example of the screen 3 displayed on the display apparatus 5. Examples of the display apparatus 5 include a liquid crystal display and an EL (Electro-Luminescence) display, but are not limited thereto. The display apparatus 5 may alternatively be an apparatus integrally formed with a display and capable of receiving television broadcasts and the like, or an apparatus in which such a display and the control apparatus 40 are integrated. To help understand descriptions below, the UI to be an operation target of the input apparatus 1 will be described as being the pointer (cursor) 2 unless stated otherwise.

UIs such as icons 4A and 4B and the pointer 2 are displayed on the screen 3. The icons are obtained by imaging program functions, execution commands, file contents, and the like of a computer on the screen 3. It should be noted that the horizontal direction of the screen 3 is set as an X-axis direction and the vertical direction thereof is set as a Y-axis direction.

Figure 7:
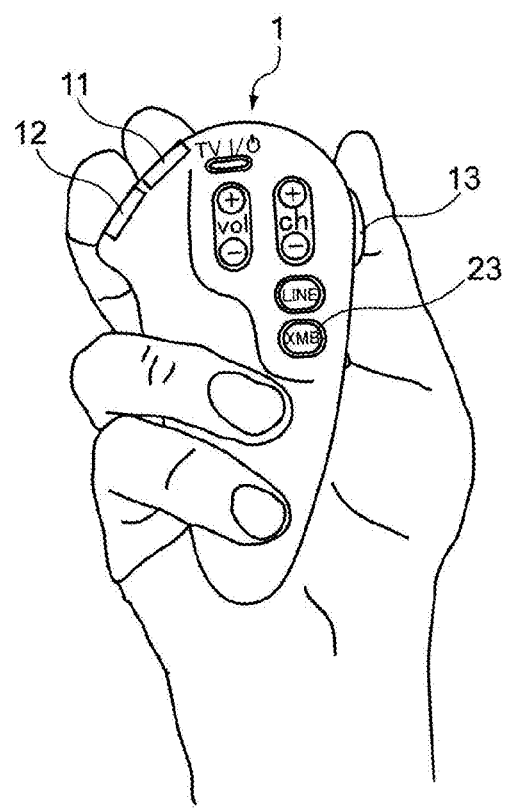
FIG. 7 is a diagram showing a state where a user is holding the input apparatus.

FIG. 7 is a diagram showing a state where the user is holding the input apparatus 1. As shown in FIG. 7, the input apparatus 1 may include, in addition to the buttons 11, 12, 13, and 23, operation sections including various operation buttons (e.g., arrow key buttons) such as those provided to a remote controller for operating a television or the like and a power switch, for example. When the user moves the input apparatus 1 in the air or operates the operation section while holding the input apparatus 1 as shown in the figure, input information is output to the control apparatus 40, and a UI is controlled by the control apparatus 40.

Figure 8A:
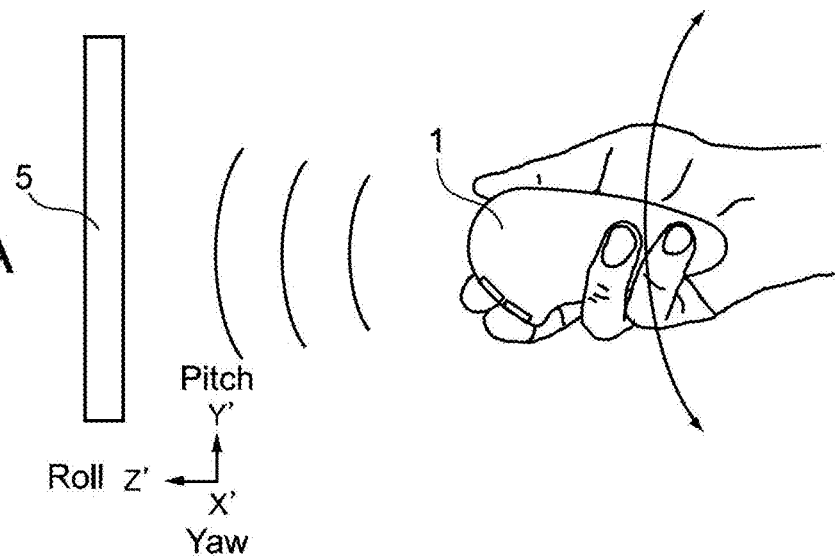
FIGS. 8A-8B are explanatory diagrams showing typical examples of ways of moving the input apparatus and ways a pointer moves on a screen accordingly.
Figure 8B:
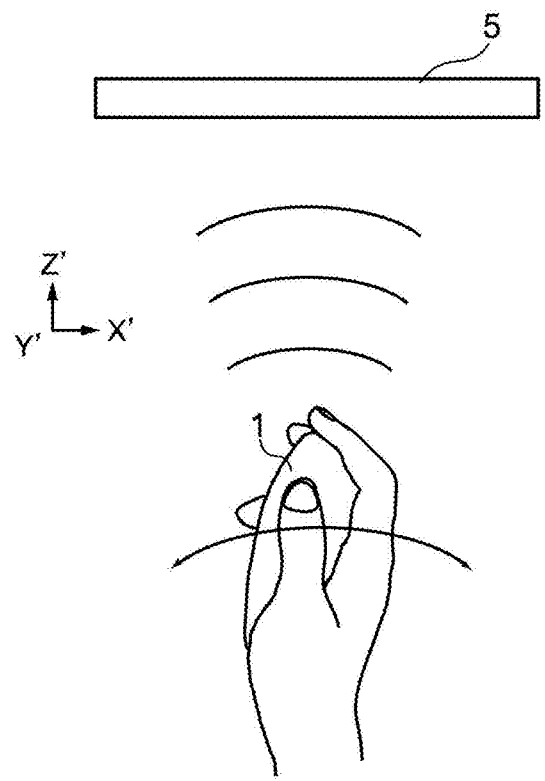

Next, a description will be given on typical examples of ways of moving the input apparatus 1 and ways the pointer 2 moves on the screen 3 accordingly. FIGS. 8A-8B are explanatory diagrams therefor.

As shown in FIGS. 8A and 8B, the user holds the input apparatus 1 so as to aim the buttons 11 and 12 side of the input apparatus 1 at the display apparatus 5 side. The user holds the input apparatus 1 so that a thumb is located on an upper side and a pinky is located on a lower side as in handshakes. In this state, the circuit board 25 (see FIG. 4) of the sensor unit 17 is substantially in parallel with the screen 3 of the display apparatus 5, and the two axes as the detection axes of the sensor unit 17 respectively correspond to the horizontal axis (X axis) and the vertical axis (Y axis) on the screen 3. Hereinafter, the position of the input apparatus 1 as shown in FIGS. 8A and 8B is referred to as reference position.

As shown in FIG. 8A, when the user swings a wrist or an arm in the vertical direction, that is, the pitch direction while the input apparatus 1 is in the reference position, the second acceleration sensor 162 detects an acceleration in the Y'-axis direction and the first angular velocity sensor 151 detects an angular velocity about the X' axis (see FIG. 4). Based on those detection values, the control apparatus 40 controls display of the pointer 2 such that the pointer 2 moves in the Y-axis direction in FIG. 6.

Meanwhile, as shown in FIG. 8B, when the user swings the wrist or the arm in the horizontal direction, that is, the yaw direction while the input apparatus 1 is in the reference position, the first acceleration sensor 161 detects an acceleration in the X'-axis direction and the second angular velocity sensor 152 detects an angular velocity about the Y' axis (see FIG. 4). Based on those detection values, the control apparatus 40 controls display of the pointer 2 such that the pointer 2 moves in the X-axis direction shown in FIG. 6.

(Description on Operation)

Next, an operation of the control system 100 structured as described above will be described.

Figure 9:
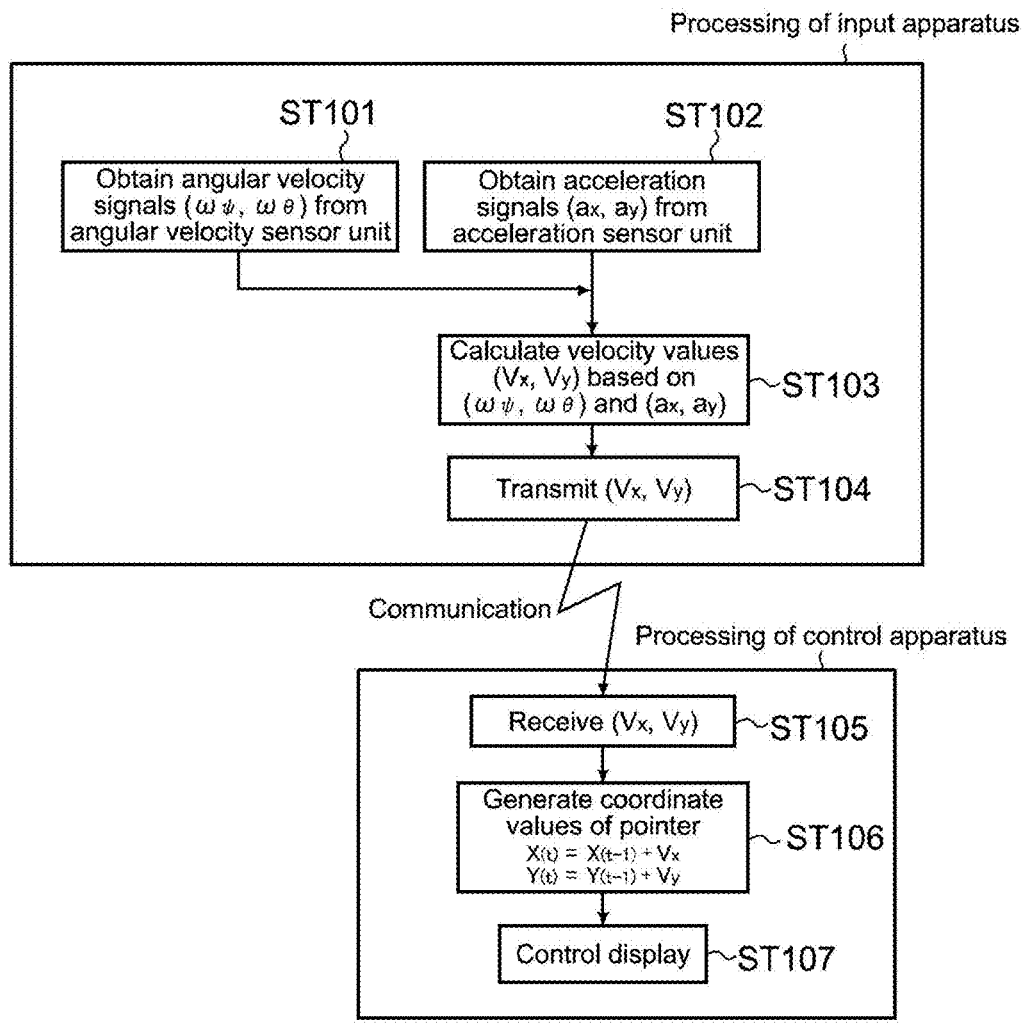
FIG. 9 is a flowchart showing an operation of the control system.

First, an operation of the control system 100 in a case where the pointer 2 moves on the screen 3 in accordance with a 3-dimensional operation of the user (pointer mode) will be described briefly. FIG. 9 is a flowchart showing the operation of the control system 100 in this case.

As shown in FIG. 9, when the user presses the power supply switch 28 and the power of the input apparatus 1 is thus turned on, for example, biaxial angular velocity signals are output from the angular velocity sensor unit. The MPU 50 acquires angular velocity values ($\omega_\psi$, $\omega_\theta$) from the angular velocity signals (Step 101).

Further, upon turning on the power of the input apparatus 1, biaxial acceleration signals are output from the acceleration sensor unit 16. The MPU 50 acquires acceleration values ($a_x$, $a_y$) from the biaxial acceleration signals (Step 102).

The MPU 50 typically carries out the process of acquiring angular velocity values ($\omega_\psi$, $\omega_\theta$) (Step 101) and the process of acquiring acceleration values ($a_x$, $a_y$) (Step 102) in sync. However, the process of acquiring angular velocity values ($\omega_\psi$, $\omega_\theta$) and the process of acquiring acceleration values ($a_x$, $a_y$) do not always need to be carried out in sync (at the same time). For example, the acceleration values ($a_x$, $a_y$) may be obtained after the angular velocity values ($\omega_\psi$, $\omega_\theta$) are obtained, or the angular velocity values ($\omega_\psi$, $\omega_\theta$) may be obtained after the acceleration values ($a_x$, $a_y$) are obtained.

Based on the acceleration values ($a_x$, $a_y$) and the angular velocity values ($\omega_\psi$, $\omega_\theta$), the MPU 50 calculates velocity values (first velocity value $V_x$ and second velocity value $V_y$) by a predetermined operation (Step 103). The first velocity value $V_x$ is a velocity value in a direction along the X' axis, and the second velocity value $V_y$ is a velocity value in a direction along the Y' axis.

As a method of calculating the velocity values ($V_x$, $V_y$), there is a method in which the MPU 50 calculates the velocity values by, for example, integrating the acceleration values ($a_x$, $a_y$) while using the angular velocity values ($\omega_\psi$, $\omega_\theta$) as an adjunct for the integration operation.

Alternatively, the MPU 50 may calculate radius gyrations ($R_\psi$, $R_\theta$) of the input apparatus 1 by dividing the acceleration values ($a_x$, $a_y$) by angular acceleration values ($\Delta\omega_\psi$, $\Delta\omega_\theta$). In this case, the velocity values ($V_x$, $V_y$) can be obtained by multiplying the radius gyrations ($R_\psi$, $R_\theta$) by the angular velocity values ($\omega_\psi$, $\omega_\theta$). Alternatively, the radius gyrations ($R_\psi$, $R_\theta$) may be obtained by dividing acceleration change rates ($\Delta a_x$, $\Delta a_y$) by angular acceleration change rates ($\Delta(\Delta\psi_\psi)$, $\Delta(\Delta\omega_\theta)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1. However, the velocity values ($V_x$, $V_y$) do not always need to be calculated by the calculation method above. For example, it is also possible for the velocity values ($V_x$, $V_y$) to be calculated by simply integrating the acceleration values ($a_x$, $a_y$). Alternatively, the detected angular velocity values ($\omega_\psi$, $\omega_\theta$) may be used as they are as the velocity values ($V_x$, $V_y$). It is also possible to calculate angular acceleration values ($\Delta\omega_\psi$, $\Delta\omega_\theta$) by temporally differentiating the detected angular velocity values ($\omega_\psi$, $\omega_\theta$) and use them as acceleration values.

The MPU 50 transmits information on the calculated velocity values ($V_x$, $V_y$) to the control apparatus 40 via the transceiver 21 and the antenna 22 (Step 104).

The MPU 35 of the control apparatus 40 receives the information on the velocity values ($V_x$, $V_y$) via the antenna 39 and the transceiver 38 (Step 105). In this case, the input apparatus 1 transmits the velocity values ($V_x$, $V_y$) every predetermined number of clocks, that is, every time a predetermined time passes, so the control apparatus 40 receives the velocity values every predetermined number of clocks.

Upon receiving the velocity values, the MPU 35 of the control apparatus 40 generates new coordinate values (X(t), Y(t)) by adding the velocity values to coordinate values using Equations (1) and (2) below (Step 106). The MPU 35 controls display on the screen so that the pointer 2 moves to a position corresponding to the generated coordinate values (Step 107).

$$X(t)=X(t-1)+V_x \qquad (1)$$

$$Y(t)=Y(t-1)+V_y \qquad (2)$$

It should be noted that the calculation of the velocity values ($V_x$, $V_y$) may be executed by the control apparatus 40. In this case, the input apparatus 1 transmits information on the angular velocity values ($\omega_\psi$, $\omega_\theta$) and the acceleration values ($a_x$, $a_y$) to the control apparatus 40 via the transceiver 21 and the antenna 22. Based on the information on the angular velocity values ($\omega_\psi$, $\omega_\theta$) and the acceleration values ($a_x$, $a_y$) received via the antenna 39 and the transceiver 38, the control apparatus 40 calculates the velocity values ($V_x$, $V_y$). The method of calculating the velocity values is as described above.

It should be noted that in FIG. 9 and the like, the acceleration signals are obtained by the acceleration sensor unit after the angular velocity signals are obtained by the angular velocity sensor unit. However, the order is not limited thereto, and the angular velocity signals may be obtained after the acceleration signals are obtained, or the acceleration signals and the angular velocity signals may be obtained in parallel (at the same time) (the same holds true for FIG. 10 below).

The input apparatus 1 may be a remote controller used for remotely operating a television and the like or an input apparatus for a game device.

(Operation Mode Switch Operation)

Next, a switch of operation modes of the input apparatus 1 and the control apparatus 40 will be described.

Figure 10:
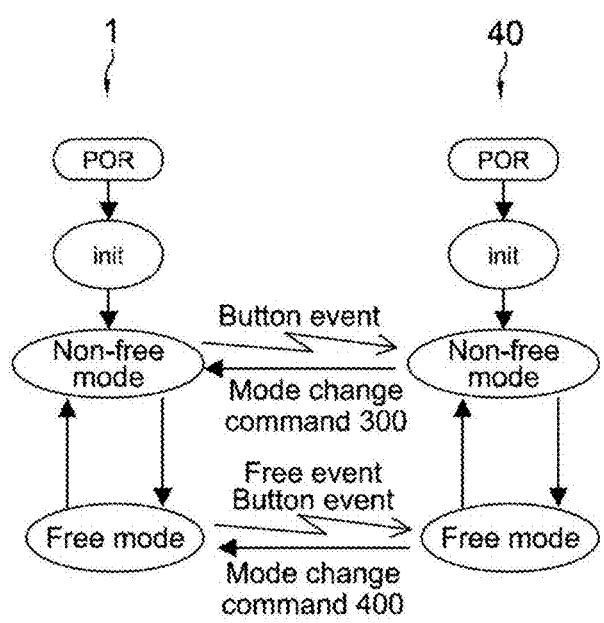
FIG. 10 is a diagram showing mode shifts of the input apparatus and a control apparatus.

FIG. 10 is a diagram showing mode sifts of the input apparatus 1 and the control apparatus 40.

(Operational Shift of Input Apparatus 1)

The input apparatus 1 shifts to operation modes of a reset mode (POR: Power On Reset), an initialization mode (Init), a non-free mode (second mode), and a free mode (first mode).

The reset mode (POR) is a mode right after power of the input apparatus 1 is turned on. After that, the MPU 50 shifts to device initialization processing.

The initialization mode (Init) is a mode after initialization of hardware of the MPU 50 is completed. The input apparatus 1 (MPU 50) determines a frequency of radio waves used for performing wireless communication with a wireless communication device on the control apparatus 40 side and acquires an identification code from the wireless communication device. As a result, wireless communication between the input apparatus 1 and the control apparatus 40 becomes possible. At a point wireless communication is made possible, the input apparatus 1 (MPU 50) shifts to, for example, the non-free mode.

The non-free mode is an operation mode in which the control apparatus 40 does not require detection signals of the angular velocity sensor unit 15 and the acceleration sensor unit 16 of the input apparatus 1. In other words, in the non-free mode, the input apparatus 1 (MPU 50) turns off at least the switch 51 out of the switch 51 of the angular velocity sensor unit 15 and the switch 52 of the acceleration sensor unit 16, for example. In the non-free mode, the input apparatus 1 (MPU 50) does not calculate the velocity values ($V_x$, $V_y$) of the cursor 2 shown in FIG. 6 in the X- and Y-axis directions. In the non-free mode, the input apparatus 1 (MPU 50) detects an on/off state of the buttons 11, 12, 13, and 23 and the like. Accordingly, the cursor 2 is operated based on an input signal from a mechanical tact switch 11 and the like.

It should be noted that in the non-free mode, it is also possible to set a communication mode of the input apparatus 1 so that a wireless communication data amount (data transfer rate) between the input apparatus 1 and the control apparatus 40 becomes smaller than that in the free mode. For example, a packet size only needs to be reduced or a packet transmission/reception interval only needs to be prolonged. Moreover, in the non-free mode, it is also possible to set an operation frequency (clock count) of the MPU 50 so that the operation frequency (clock count) of the MPU 50 becomes smaller than that in the free mode (low clock).

Specifically, when a screen on which the cursor 2 can be operated with just the button 11, the arrow key, and the like or a viewing program is displayed on the screen 3, the control apparatus 40 does not require the angular velocity sensor unit 15 and the acceleration sensor unit 16 for operating the cursor 2. At this time, an operation mode of the input apparatus 1 shifts to the non-free mode.

In the non-free mode, the input apparatus 1 (MPU 50) is capable of transmitting information on an on/off state of the buttons 11, 12, 13, and 23 and the like (button event) to the control apparatus 40 through wireless communication via the transceiver 21.

In the non-free mode, the input apparatus 1 (MPU 50) is capable of receiving a mode change command 300 to be described later from the control apparatus 40. Upon receiving the mode change command 300, the input apparatus 1 (MPU 50) shifts to the free mode.

The free mode is an operation mode in which the control apparatus 40 requires detection signals from the angular velocity sensor unit 15 and the acceleration sensor unit 16 of the input apparatus 1. In other words, in the free mode, the input apparatus 1 (MPU 50) turns on the switch 51 of the angular velocity sensor unit 15 and the switch 52 of the acceleration sensor unit 16. Then, the input apparatus 1 (MPU 50) reads out detection signals of angular velocities and accelerations respectively detected by the angular velocity sensor unit 15 and the acceleration sensor unit 16 and calculates velocity values ($V_x$, $V_y$) of the cursor 2 shown in FIG. 6 in the X- and Y-axis directions. Further, the input apparatus 1 (MPU 50) detects an on/off state of the buttons 11, 12, 13, and 23 and the like. Accordingly, the cursor 2 is operated based on an operation of the input apparatus 1 or an operation signal from the button 11 and the like.

It should be noted that it is also possible to set the communication mode so that a wireless communication data amount between the input apparatus 1 and the control apparatus 40 becomes larger than that in the non-free mode.

For example, a packet size only needs to be increased or a packet transmission/reception interval only needs to be shortened. Moreover, the operation frequency (clock count) of the MPU 50 may be set so that the operation frequency (clock count) thereof becomes larger than that in the non-free mode (high clock).

The free mode of the input apparatus 1 (MPU 50) is an operation mode with which free cursor, zoom, scroll, gestures, and the like can be realized, for example.

In the free mode, the input apparatus 1 (MPU 50) transmits information on the velocity values ($V_x$, $V_y$) (free event) and information on the on/off state of the buttons 11, 12, 13, and 23 and the like (button event) to the control apparatus 40 through wireless communication via the transceiver 21.

In the free mode, the input apparatus 1 (MPU 50) is capable of receiving a mode change command 400 to be described later from the control apparatus 40. Upon receiving the mode change command 400, the input apparatus 1 (MPU 50) shifts to the non-free mode.

(Operational Shift of Control Apparatus 40)

The control apparatus 40 shifts to modes of a reset mode (POR), an initialization mode (Init), a non-free mode, and a free mode.

The reset mode (POR) is a mode right after power of the control apparatus 40 is turned on. After that, the MPU 35 shifts to device initialization processing.

The initialization mode (Init) is a mode after initialization of hardware of the MPU 35 is completed.

At a point wireless communication with the input apparatus 1 has become possible as described above, the control apparatus 40 (MPU 35) shifts to, for example, the non-free mode.

In the non-free mode, velocity values ($V_x$, $V_y$) are not transmitted from the input apparatus 1, and the control apparatus 40 (MPU 35) receives information on an on/off state of the buttons 11, 12, 13, and 23 and the like (button event) from the input apparatus 1 through wireless communication via the transceiver 38. As described above, it is also possible to set a communication mode so that a data amount received from the input apparatus 1 through wireless communication becomes smaller than that in the free mode.

Based on information on the button event and information on the table stored in the ROM 37 (see FIG. 1) in advance, the control apparatus 40 (MPU 35) judges which of the free mode and the non-free mode the input apparatus 1 is to be shifted to (shift destination judgment). The table is a data table that stores, for example, an icon selected by the user and a shift destination mode in association with each other. In the non-free mode, the control apparatus 40 (MPU 35) is capable of transmitting to the input apparatus 1, based on a result of the shift destination judgment, the mode change command 300 for causing the operation mode of the input apparatus 1 to shift from the non-free mode to the free mode. In the non-free mode, the control apparatus 40 (MPU 35) shifts its own mode from the non-free mode to the free mode based on the shift destination judgment result.

In the free mode, the control apparatus 40 (MPU 35) receives information on velocity values ($V_x$, $V_y$) (free event) and the information on the on/off state of the button 11 and the like (button event) from the input apparatus 1 through wireless communication via the transceiver 38. It should be noted that as described above, it is also possible to set the communication mode so that the data amount received from the input apparatus 1 through wireless communication becomes larger than that in the non-free mode.

In the free mode, the control apparatus 40 (MPU 35) is capable of transmitting to the input apparatus 1, based on the shift destination judgment result described above, the mode change command 400 for causing the operation mode of the input apparatus 1 to shift from the free mode to the non-free mode.

In the free mode, the control apparatus 40 (MPU 35) shifts its own mode from the free mode to the non-free mode based on the shift destination judgment result.

(Example)

Hereinafter, a specific example of mode shifts of the input apparatus 1 and the control apparatus 40 will be described.

FIGS. 11A-11E are diagrams showing a case where the operation mode of the input apparatus 1 is changed by the mode change command 300 and the mode change command 400 from the control apparatus 40. FIG. 12 is a sequence diagram in this case.

When power of the input apparatus 1, the control apparatus 40, and the display apparatus 5 is turned on by the user, the input apparatus 1 and the control apparatus 40 shift to, for example, the non-free mode as shown in FIG. 10. At this time, as shown in FIG. 11A, a viewing program screen is displayed on a screen 3A of the display apparatus 5, for example.

When an operation for displaying a non-free GUI screen 3B (e.g., button operation) is made by the user, for example, the input apparatus 1 transmits a command C1 corresponding to the operation to the control apparatus 40 as shown in FIG. 12. The control apparatus 40 receives the command C1 via the transceiver 38 and displays the non-free GUI screen 3B shown in FIG. 11B on the display apparatus 5. The term "non-free" refers to a state where the control apparatus 40 does not require outputs of the angular velocity sensor unit 15 and the acceleration sensor unit 16 and the user is capable of operating the cursor 2 by an operation to the button 11, the arrow key, or the like.

Figure 11:
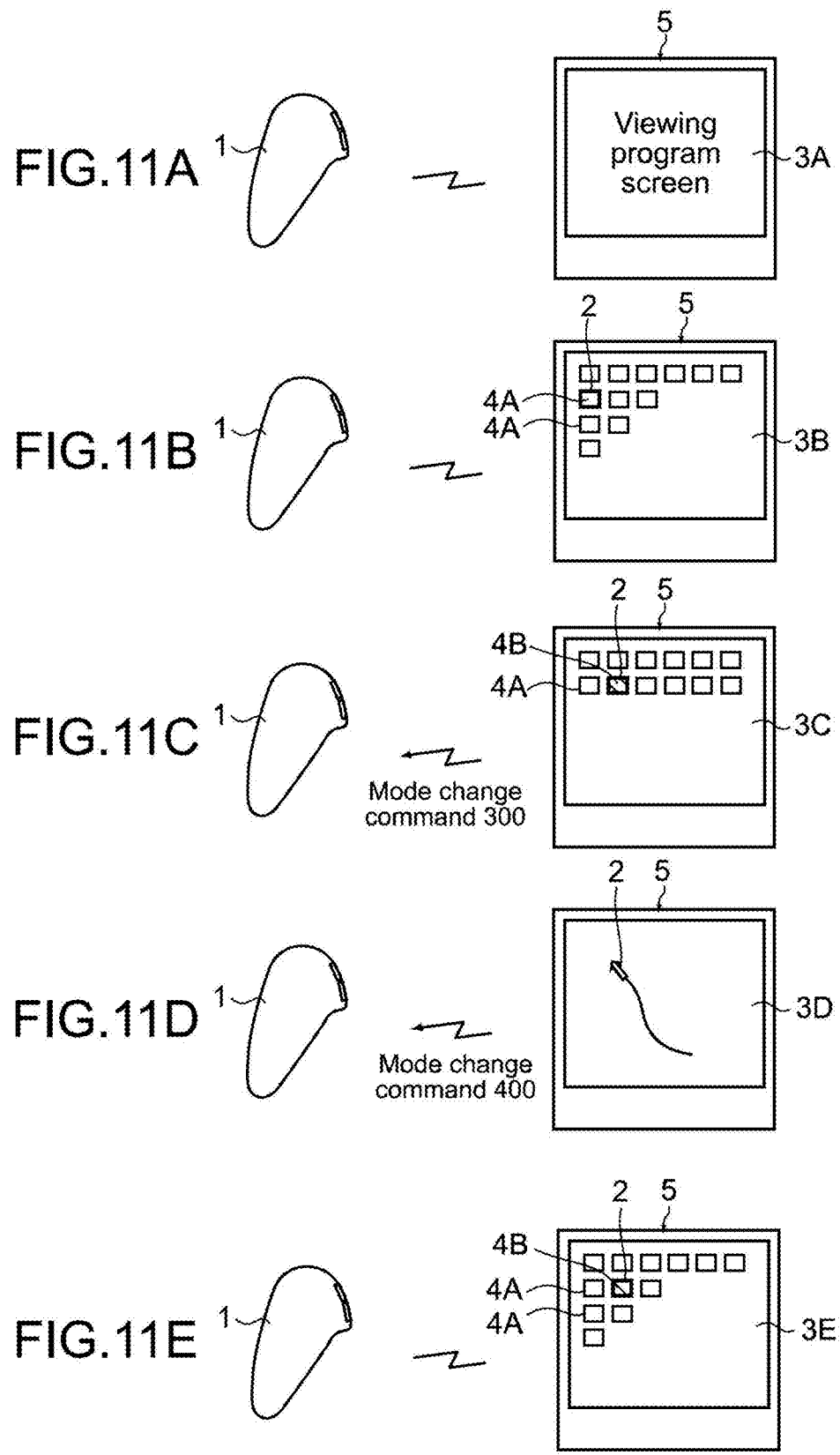
FIGS. 11A-11E are diagrams showing a case where an operation mode of the input apparatus is changed by a mode change command from the control apparatus.
Figure 12:
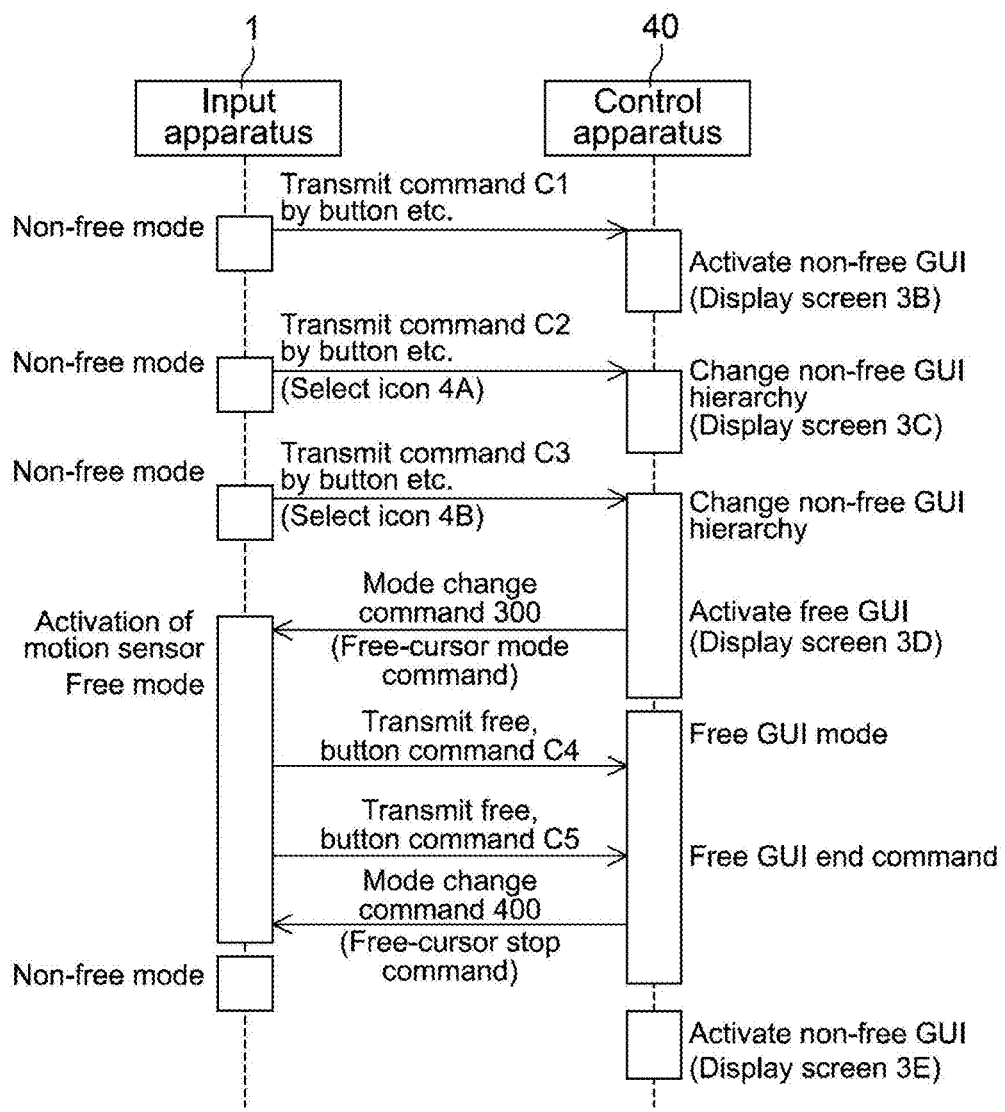
FIG. 12 is a sequence diagram showing a case where the operation mode of the input apparatus is changed by the mode change command from the control apparatus.

When the user selects an icon 4A shown in FIG. 11B, for example, the input apparatus 1 transmits a command C2 corresponding to the selection to the control apparatus 40 as shown in FIG. 12.

The control apparatus 40 receives the command C2 via the transceiver 38 and judges a shift destination mode corresponding to the selected icon 4A based on the table. When judging that the shift destination mode is the non-free mode, the control apparatus 40 displays, for example, a non-free GUI screen 3C shown in FIG. 11C on the display apparatus 5. Accordingly, a non-free GUI hierarchy changes. In other words, the hierarchy changes from a hierarchy including the icon 4A and the like shown in FIG. 11B to a hierarchy including the icon 4B and the like shown in FIG. 11C.

When the user selects the icon 4B shown in FIG. 11C, the input apparatus 1 transmits a command C3 corresponding to the selection to the control apparatus 40 as shown in FIG. 12.

The control apparatus 40 receives the command C3 via the transceiver 38 and judges a shift destination mode corresponding to the selected icon 4B based on the table. When judging that the shift destination mode is the free mode, the control apparatus 40 displays, for example, a free GUI screen 3D shown in FIG. 11D on the display apparatus 5. Accordingly, the non-free GUI screen 3C is changed to the free GUI screen 3D. Here, the term "free" refers to a state where the control apparatus 40 requires outputs of the angular velocity sensor unit 15 and the acceleration sensor unit 16.

At this time, as shown in FIG. 12, the control apparatus 40 transmits the mode change command 300 for changing the mode of the input apparatus 1 to the input apparatus 1. The mode change command 300 is a command for changing the operation mode of the input apparatus 1 from the non-free mode to the free mode (free cursor mode command).

The input apparatus 1 receives the mode change command 300 and changes the operation mode thereof from the non-free mode to the free mode.

Specifically, the switch 51 of the angular velocity sensor unit 15 and the switch 52 of the acceleration sensor unit 16 are turned on. It should be noted that it is also possible to set the wireless communication device so that the wireless communication data amount between the input apparatus 1 and the control apparatus 40 becomes larger than that in the non-free mode. For example, a packet size only needs to be increased or a packet transmission/reception interval only needs to be shortened. Moreover, the MPU 50 may be set so that the operation frequency (clock count) thereof becomes larger than that in the non-free mode.

Based on an operation made to the input apparatus 1 by the user, the input apparatus 1 transmits a command corresponding to the velocity values ($V_x$, $V_y$) (free command) and a command (button command) corresponding to the button 11 and the like (C4) to the control apparatus 40. The control apparatus 40 receives such a command (free command and button command) C4 and displays, for example, the cursor 2 on the display screen 3D.

When the user selects an icon for ending the free mode (shifting to non-free mode), for example, the input apparatus 1 transmits a command (free command and button command) C5 corresponding to the selection to the control apparatus 40.

The control apparatus 40 receives the command C5 via the transceiver 38, transmits the mode change command 400 to the input apparatus 1, changes the operation mode of the control apparatus 40 from the free mode to the non-free mode, and displays a non-free GUI screen 3E shown in FIG. 11E.

The input apparatus 1 receives the mode change command 400. As a result, the operation mode of the input apparatus 1 is changed from the free mode to the non-free mode.

In other words, the input apparatus 1 turns off at least the switch 51 out of the switch 51 of the angular velocity sensor unit 15 and the switch 52 of the acceleration sensor unit 16. Accordingly, on/off of operations of the angular velocity sensor unit 15 and the acceleration sensor unit 16 (plurality of detection sections) are controlled individually. It should be noted that the input apparatus 1 may set the wireless communication device so that the wireless communication data amount (data transfer rate) between the input apparatus 1 and the control apparatus 40 becomes smaller than that in the free mode. Conversely, it is also possible for the MPU 50 to set, when the input apparatus 1 receives the mode change command 300, the wireless communication device so that the wireless communication data amount (data transfer rate) becomes larger than that in the non-free mode. Moreover, it is also possible for the MPU 50 to switch its own operation frequency so that the operation frequency thereof (clock count) becomes smaller than that in the free mode. It should be noted that, conversely, it is also possible for the MPU 50 to switch, when the input apparatus 1 receives the mode change command 300, its own operation frequency so that the operation frequency thereof becomes larger than that in the non-free mode.

It should be noted that the user can operate the cursor 2 in the free mode and the non-free mode when the operation mode of the input apparatus 1 matches that of the control apparatus 40.

According to this embodiment, the control apparatus 40 includes the MPU 35 that judges the shift destination mode of the input apparatus 1 based on the table that stores, for example, the icon 4A or 4B selected by the user and the shift destination mode of the input apparatus 1 corresponding to the selected icon 4A or 4B in association with each other. The control apparatus 40 includes the transceiver 38 that transmits to the input apparatus 1 the mode change command 400 or the like for changing the mode of the input apparatus 1 based on the judgment result. As a result, when the icon 4B is selected by the user, for example, the MPU 35 of the control apparatus 40 judges that the shift destination mode is the non-free mode based on the selected icon 4B and transmits the mode change command 400 to the input apparatus 1. The input apparatus 1 receives the mode change command 400 and the like. Consequently, the MPU 50 of the input apparatus 1 switches the free mode and the non-free mode in association with the display screen 3C to be displayed on the display apparatus 5. The MPU 50 turns off at least the switch 51 out of the switch 51 of the angular velocity sensor unit 15 and the switch 52 of the acceleration sensor unit 16. Accordingly, at least power supply to the angular velocity sensor unit 15 is stopped in the non-free mode. Therefore, power consumption of the input apparatus 1 can be reduced.

Upon receiving the mode change command 400, the input apparatus 1 may set the wireless communication device so that the wireless communication data amount between the input apparatus 1 and the control apparatus 40 becomes smaller than that in the free mode. As a result, it is possible to reduce the wireless communication data amount and additionally reduce power consumption of the input apparatus 1.

Upon receiving the mode change command 400, the input apparatus 1 may set the MPU 50 so that the operation frequency (clock count) of the MPU 50 becomes smaller than that in the free mode. As a result, power consumption of the MPU 50 can be additionally reduced.

It is also possible for the control apparatus 40 to transmit, while executing a mode (after shifting to shift destination operation mode), the mode change command 300 or mode change command 400 for shifting to the mode being executed at predetermined timings (constantly or intermittently). Accordingly, the mode of the input apparatus 1 can positively be changed to the mode being executed.

It should be noted that this embodiment has shown the example in which the input apparatus 1 and the control apparatus 40 shift to the non-free mode after the initialization mode (Init). However, the input apparatus 1 and the control apparatus 40 may shift to the free mode after the initialization mode (Init).

Further, in this embodiment, commands can be exchanged between the input apparatus 1 and the control apparatus 40 when the operation modes of the input apparatus 1 and the control apparatus 40 match. However, it is also possible to turn off the switch 51 of the angular velocity sensor unit 15 and the switch 52 of the acceleration sensor unit 16 of the input apparatus 1 (MPU 50) or cut off power supply to the input apparatus 1, for example, when wireless communication between the input apparatus 1 and the control apparatus 40 is disabled. Accordingly, power of the input apparatus 1 can be prevented from being consumed wastefully when wireless communication is disabled.

(Another Embodiment)

Figure 13:
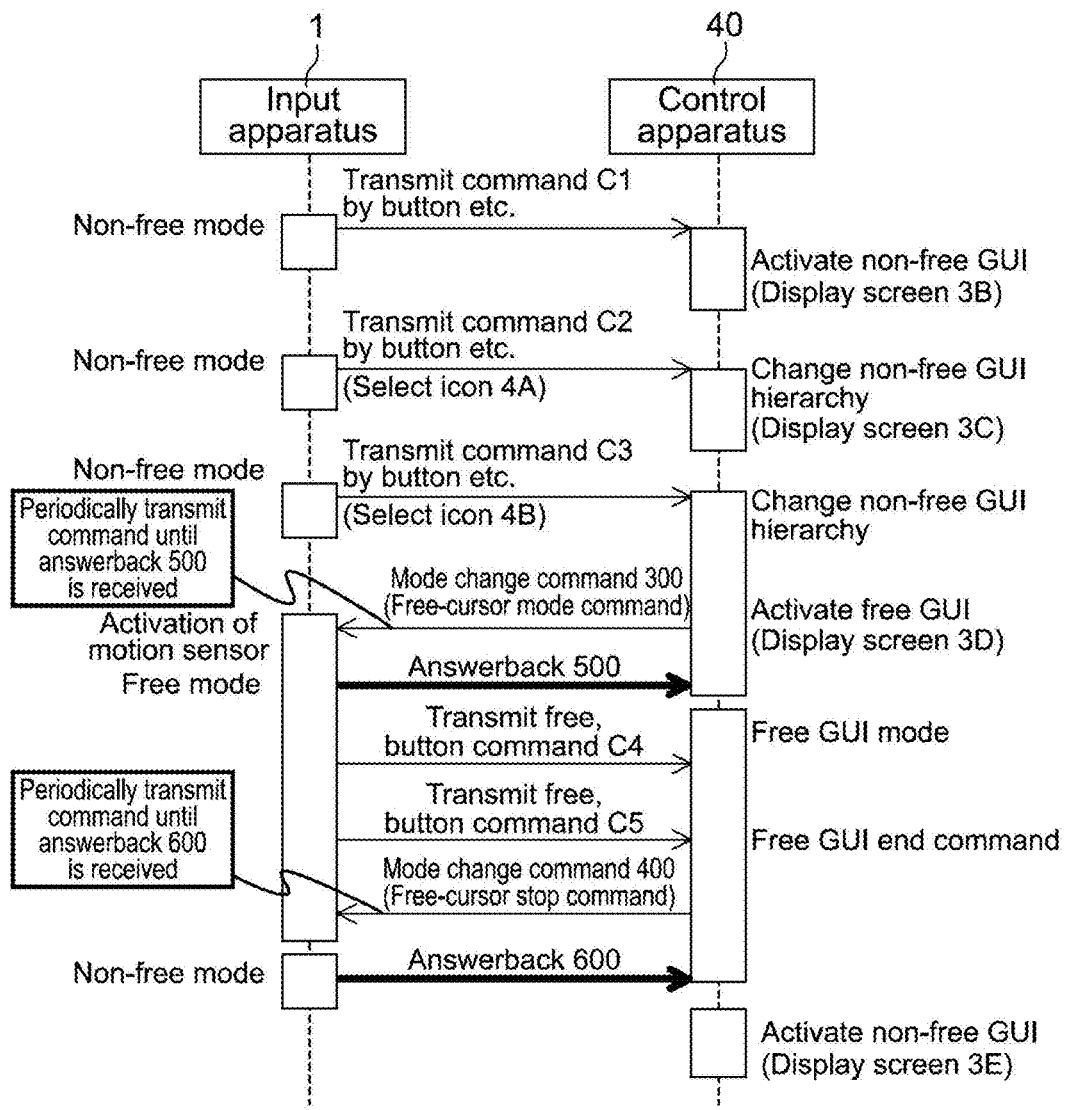
FIG. 13 is a sequence diagram according to another embodiment in which the operation mode of the input apparatus is changed by the mode change command from the control apparatus.

FIG. 13 is a sequence diagram of another embodiment in which the operation mode of the input apparatus 1 is changed by the mode change command 300 and the mode change command 400 from the control apparatus 40. It should be noted that in this and subsequent embodiments, constituent elements that are the same as those of the above embodiment are denoted by the same reference symbols, and different points will mainly be described.

This embodiment is different from the above embodiment in that the input apparatus 1 transmits, upon receiving the mode change command 300 shown in FIG. 13, an answerback 500 indicating the reception to the control apparatus 40.

Upon receiving the answerback 500, the control apparatus 40 stops transmitting the mode change command 300 to the input apparatus 1. In other words, the control apparatus 40 continues transmitting the mode change command 300 to the input apparatus 1 at predetermined timings until the answerback 500 is received. It should be noted that it is also possible for the control apparatus 40 to transmit the mode change command 300 a predetermined number of times irrespective of whether the answerback 500 is received.

This embodiment is different from the above embodiment in that the input apparatus 1 transmits, upon receiving the mode change command 400 shown in FIG. 13, an answerback 600 indicating the reception to the control apparatus 40.

Upon receiving the answerback 600, the control apparatus 40 stops transmitting the mode change command 400 to the input apparatus 1. In other words, the control apparatus 40 continues transmitting the mode change command 400 to the input apparatus 1 at predetermined timings until the answerback 600 is received. It should be noted that it is also possible for the control apparatus 40 to transmit the mode change command 400 a predetermined number of times irrespective of whether the answerback 600 is received.

As described above, according to this embodiment, by receiving the answerback 500 from the input apparatus 1, the control apparatus 40 can positively detect a mode state of the input apparatus 1 and prevent the mode change command 300 from being transmitted wastefully after the detection. As a result, the input apparatus 1 does not need to continue receiving the mode change command 300 wastefully, thus saving power. It should be noted that the same holds true for the answerback 600.

It should be noted that the embodiments shown in FIGS. 12 and 13 have shown the examples in which the control apparatus 40 transmits the mode change command 300 and mode change command 400 to the input apparatus 1. However, it is also possible for the input apparatus 1 to receive a signal transmitted from the control apparatus 40 according to a sleep timer set in the control apparatus 40 in addition to those commands. Alternatively, the input apparatus 1 may turn off, upon receiving a signal indicating that the control apparatus 40 is in a sleep mode, at least the switch 51 out of the switch 51 of the angular velocity sensor unit 15 and the switch 52 of the acceleration sensor unit 16, for example. Alternatively, the input apparatus 1 may turn off, when a signal cannot be received from the control apparatus 40 (power of control apparatus 40 is off), at least the switch 51 out of the switch 51 of the angular velocity sensor unit 15 and the switch 52 of the acceleration sensor unit 16, or turn off power of the input apparatus 1 when a signal cannot be received from the control apparatus 40. Accordingly, an effect of saving power of the input apparatus 1 can be additionally improved.

Conversely, it is also possible for the input apparatus 1 to receive, when the switch 51 of the angular velocity sensor unit 15 and the switch 52 of the acceleration sensor unit 16 are turned off, for example, a signal transmitted at a predetermined time set in the control apparatus 40. Accordingly, power supplied to the input apparatus 1 can positively be cut off until the predetermined time, and power can positively be supplied to the angular velocity sensor unit 15 and the acceleration sensor unit 16 of the input apparatus 1 when reaching the predetermined time, for example. As a result, power of the input apparatus 1 can be saved.

(Another Embodiment)

Figure 14:
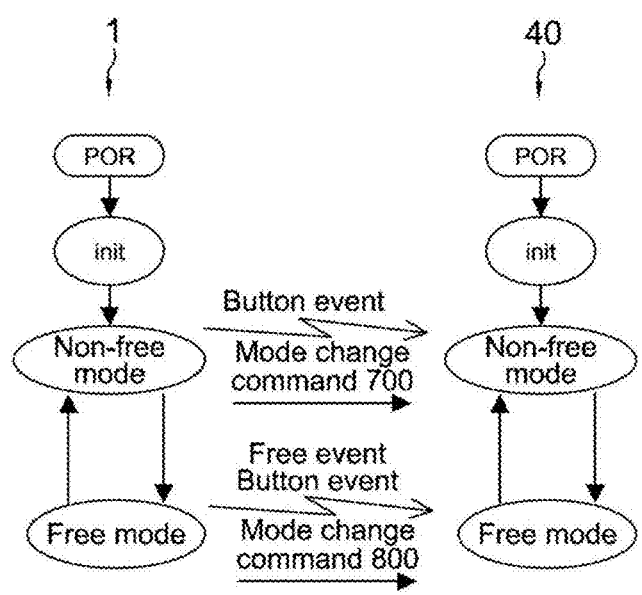
FIG. 14 is a diagram showing mode shifts of the input apparatus and the control apparatus according to another embodiment.

FIG. 14 is a diagram showing mode shifts of the input apparatus 1 and the control apparatus 40 according to another embodiment of the present invention.

(Operational Shift of Input Apparatus 1)

In the non-free mode, the input apparatus 1 (MPU 50) transmits information on an on/off state of a button (not shown) and the like (button event) to the control apparatus 40 through wireless communication via the transceiver 21.

In the non-free mode, the input apparatus 1 (MPU 50) is capable of transmitting a mode change command 700 to the control apparatus 40. The mode change command 700 is a command for changing the mode of the control apparatus 40 from the non-free mode to the free mode.

In the free mode, the input apparatus 1 (MPU 50) is capable of transmitting a mode change command 800 to the control apparatus 40. The mode change command 800 is a command for changing the operation mode of the control apparatus 40 from the free mode to the non-free mode.

(Operational Shift of Control Apparatus 40) In the non-free mode, the control apparatus 40 (MPU 35) receives the information on an on/off state of the button (not shown) and the like (button event) from the input apparatus 1 through wireless communication via the transceiver 38.

In the non-free mode, the control apparatus 40 (MPU 35) is capable of receiving the mode change command 700 transmitted from the input apparatus 1 at a time the button (not shown) is pressed. In the non-free mode, the control apparatus 40 (MPU 35) shifts from the non-free mode to the free mode in response to the mode change command 700.

In the free mode, the control apparatus 40 (MPU 35) receives the mode change command 800 transmitted from the input apparatus 1 at a time the button 23 (or other buttons not shown) is pressed. The control apparatus 40 (MPU 35) shifts the operation mode thereof from the free mode to the non-free mode in response to the mode change command 800.

Hereinafter, a specific example of the mode shifts of the control apparatus 40 will be described.

Figure 15:
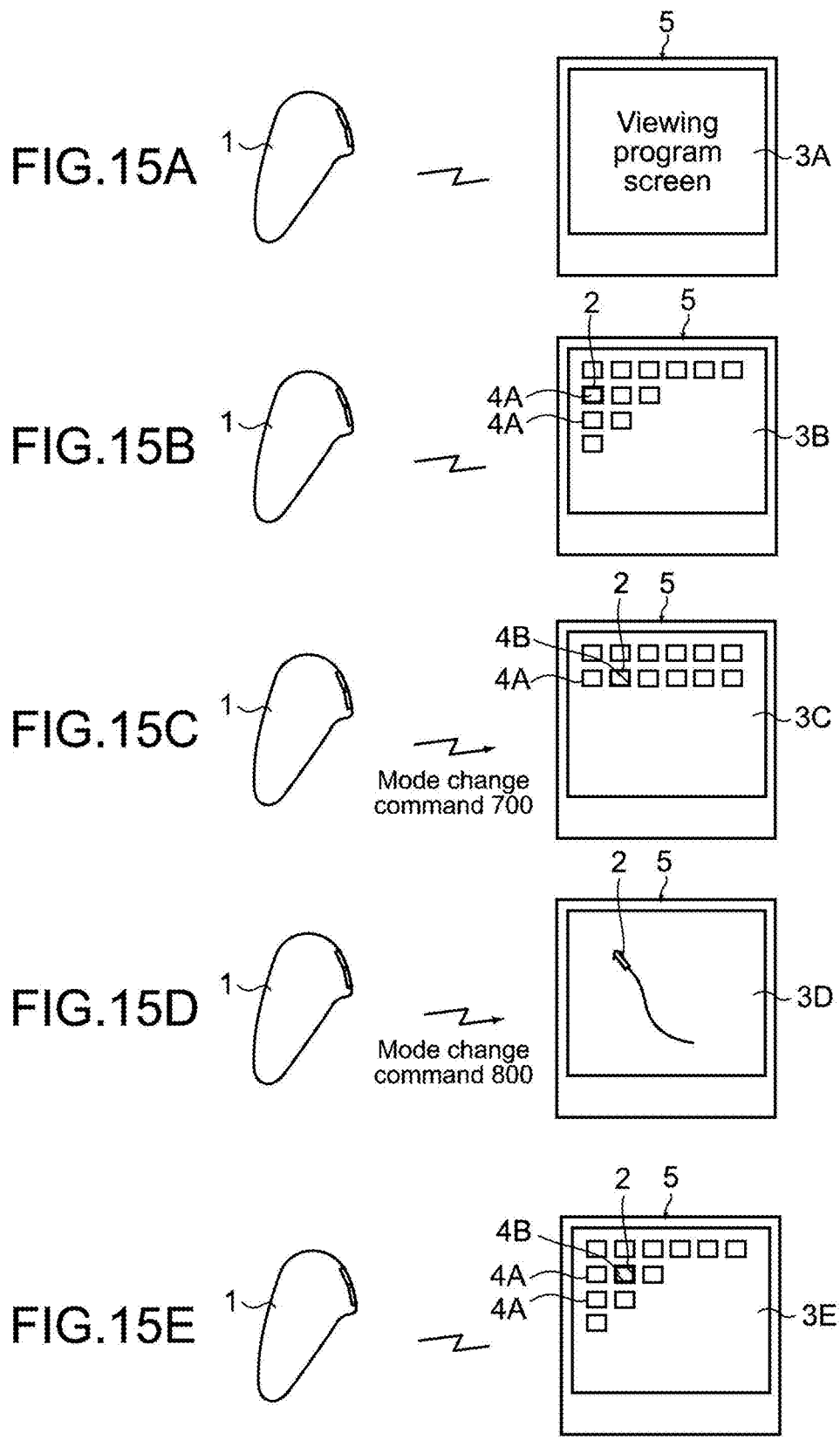
FIGS. 15A-15E are diagrams showing a case where an operation mode of the control apparatus is changed by a mode change command from the input apparatus.
Figure 16:
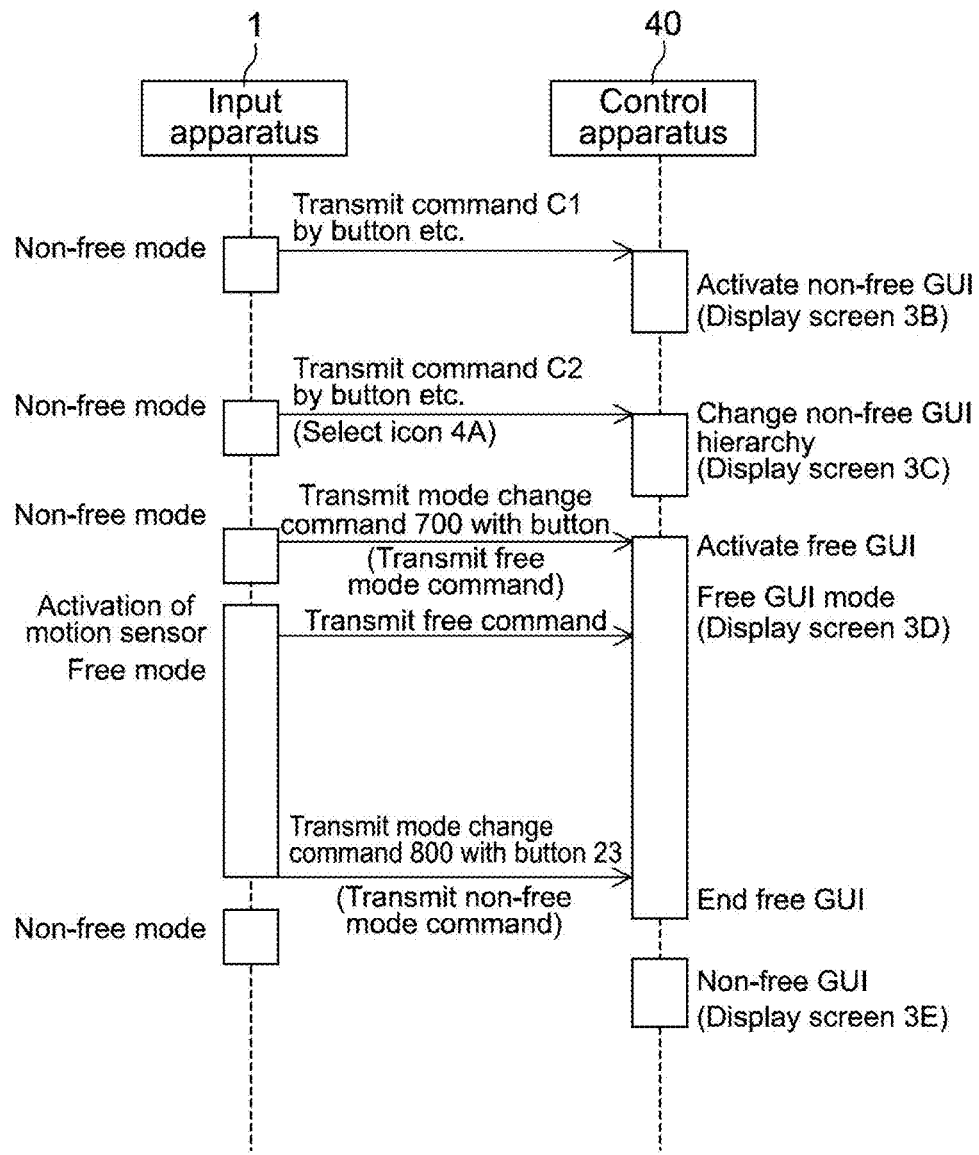
FIG. 16 is a sequence diagram of another embodiment in which the operation mode of the control apparatus is changed by the mode change command from the input apparatus.

FIGS. 15A-15E are diagrams showing a case where the operation mode of the control apparatus 40 is changed by the mode change command 700 and mode change command 800 from the input apparatus 1. FIG. 16 is a sequence diagram of another embodiment in which the operation mode of the control apparatus 40 is changed by the mode change command 700 and mode change command 800 from the input apparatus 1.

Since operations up to displaying the non-free GUI screen 3C shown in FIG. 15C on the display apparatus 5 since power of the input apparatus 1, the control apparatus 40, and the display apparatus 5 is turned on by the user are the same as that described with reference to FIGS. 11A to 11C, descriptions thereof will be omitted.

When the user presses a button (not shown), the input apparatus 1 (MPU 50) turns on the switch 51 of the angular velocity sensor unit 15 and the switch 52 of the acceleration sensor unit 16. It should be noted that the input apparatus 1 (MPU 50) may set the wireless communication device so that the wireless communication data amount between the input apparatus 1 and the control apparatus 40 becomes larger than that in the non-free mode. Moreover, the input apparatus 1 (MPU 50) may be set so that the operation frequency (clock count) thereof becomes larger than that in the non-free mode. Further, the input apparatus 1 transmits the mode change command 700 indicating that the button (not shown) has been pressed to the control apparatus 40.

The control apparatus 40 receives the mode change command 700 via the transceiver 38 and judges a shift destination mode of the control apparatus 40 that corresponds to the mode change command 700 based on a different table. The different table is a data table that stores the icon 4A and the like selected by the user and a shift destination operation mode of the control apparatus 40 in association with each other. The mode change command 700 is a command for changing the operation mode of the control apparatus 40 from the non-free mode to the free mode (free cursor mode command). When judging that the shift destination mode is the free mode, for example, the control apparatus 40 displays, for example, a free GUI screen 3D shown in FIG. 15D on the display apparatus 5. Accordingly, the non-free GUI screen 3C is changed to the free GUI screen 3D.

It should be noted that instead of the input apparatus 1 transmitting the mode change command 700 to the control apparatus 40, it is also possible to change a setting of the wireless communication device with respect to the input apparatus 1 and the control apparatus 40 as described above. Specifically, transmission forms of the input apparatus 1 and the control apparatus 40 only need to be changed to a form in which a packet size is large and a packet transmission/reception interval is small or a form in which the packet size is small and the packet transmission/reception interval is large. Accordingly, the input apparatus 1 can transmit a signal having the same function as the mode change command to the control apparatus 40 and change the mode of the control apparatus 40 as in this embodiment.

When the user presses the button 23 (or other buttons not shown) of the input apparatus 1 for changing the mode from the free mode to the non-free mode, for example, the input apparatus 1 turns off at least the switch 51 out of the switch 51 of the angular velocity sensor unit 15 and the switch 52 of the acceleration sensor unit 16. It should be noted that it is also possible for the input apparatus 1 to set the wireless communication device so that the wireless communication data amount between the input apparatus 1 and the control apparatus 40 becomes smaller than that in the free mode. Moreover, the MPU 50 may be set so that the operation frequency (clock count) thereof becomes smaller than that in the free mode.

Moreover, when the user presses the button 23 (or other buttons not shown) of the input apparatus 1 for changing the mode from the free mode to the non-free mode, the input apparatus 1 transmits the mode change command 800 indicating that the button 23 has been pressed to the control apparatus 40.

The control apparatus 40 receives the mode change command 800 via the transceiver 38 and judges the shift destination mode of the control apparatus 40 corresponding to the mode change command 800 based on a different table. The mode change command 800 is a command for changing the operation mode of the control apparatus 40 from the free mode to the non-free mode (free cursor mode command). When judging that the shift destination mode is the non-free mode, for example, the control apparatus 40 displays, for example, a non-free GUI screen 3E shown in FIG. 15E on the display apparatus 5. Accordingly, the free GUI screen 3D is changed to the non-free GUI screen 3E.

As described above, according to this embodiment, since the input apparatus 1 includes the button 23 (or other buttons not shown) for changing the operation mode of the control apparatus 40, the operation mode of the control apparatus 40 can be changed by pressing the button 23 or the like of the input apparatus 1. When the user presses the button 23 (or other buttons not shown) of the input apparatus 1, for example, the mode change command 800 is transmitted from the input apparatus 1 to the control apparatus 40. The control apparatus 40 can receive the mode change command 800 and change the mode thereof from the free mode to the non-free mode. Moreover, when the button 23 (or other buttons not shown) is pressed, the input apparatus 1 turns off at least the switch 51 out of the switch 51 of the angular velocity sensor unit 15 and the switch 52 of the acceleration sensor unit 16. As a result, power of the input apparatus 1 can be saved. Moreover, the user can immediately change the operation modes of the input apparatus 1 and the control apparatus 40 when wishing to change them.

It should be noted that this embodiment has shown the example in which the input apparatus 1 transmits the mode change command 700 and the mode change command 800 to the control apparatus 40 according to the press of the button 23 and the like. However, the present invention is not limited thereto, and commands having the same functions as the mode change command 700 and the mode change command 800 may be transmitted to the control apparatus 40 when the input apparatus 1 detects a predetermined gesture, for example. Even with this structure, the cursor 2 can be operated in the same manner.

(Another Embodiment)

Figure 17:
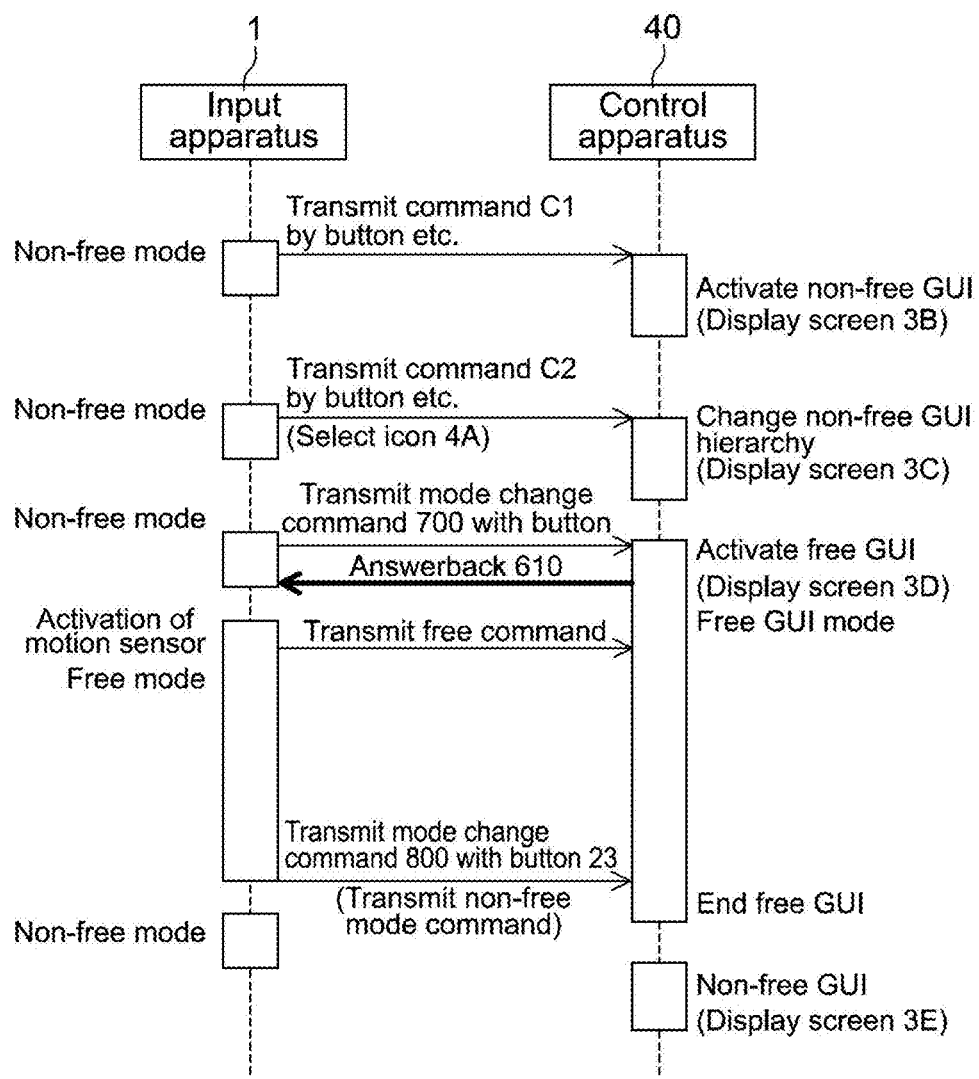
FIG. 17 is a sequence diagram of another embodiment in which the operation mode of the control apparatus is changed by the mode change command from the input apparatus.

FIG. 17 is a sequence diagram showing another embodiment of changing the operation mode of the control apparatus 40 by the mode change command 700 from the input apparatus 1.

This embodiment is different from the embodiment shown in FIG. 16 in that the control apparatus 40 transmits, upon receiving the mode change command 700 shown in FIG. 17, an answerback 610 indicating the reception to the input apparatus 1.

With this structure, by receiving the answerback 610, the input apparatus 1 can positively detect that the control apparatus 40 has received the mode change command 700. Therefore, the input apparatus 1 can be prevented from continuing to transmit the mode change command 700 to the control apparatus 40 by a user operation after the detection, for example. Further, by changing the mode of the input apparatus 1 from the non-free mode to the free mode after receiving the answerback 610, the input apparatus 1 can positively change the operation mode.

The present invention is not limited to the above embodiments and various modifications can be made.

This embodiment has shown the example in which the input apparatus 1 includes the MPU 50. However, the present invention is not limited thereto, and it is also possible for the input apparatus 1 to include a plurality of MPUs instead of the MPU 50 and realize the function of the MPU 50 with those MPUs.

As a method of calculating the velocity values ($V_x$, $V_y$), there is a method in which the MPU 50 obtains the velocity values by integrating the acceleration values ($a_x$, $a_y$), and uses the angular velocity values ($\omega_\psi$, $\omega_\theta$) as an adjunct of the integration operation, for example.

Alternatively, the MPU 50 obtains radius gyrations ($R_\psi$, $R_\theta$) of the movement of the casing 10 by dividing the acceleration values ($a_x$, $a_y$) by differential values ($\Delta\omega_\psi$, $\Delta\omega_\theta$) of the angular velocity values ($\omega_\psi$, $\omega_\theta$). The velocity values ($V_x$, $V_y$) are obtained by multiplying the radius gyrations ($R_\psi$, $R_\theta$) by the angular velocity values ($\omega_\psi$, $\omega_\theta$).

Alternatively, it is also possible to provide, as a motion sensor, the acceleration sensor unit 16 while excluding the angular velocity sensor unit 15, and calculate the velocity values ($V_x$, $V_y$) by simply integrating the acceleration values ($a_x$, $a_y$). On the contrary, it is also possible to provide, as the motion sensor, the angular velocity sensor unit 15 while excluding the acceleration sensor unit 16, and calculate the velocity values ($V_x$, $V_y$) corresponding to the angular velocity values ($\omega_\psi$, $\omega_\theta$) by an operation or a lookup table.

The input apparatus 1 according to the above embodiments has transmitted input information to the control apparatus wirelessly. However, the input information may be transmitted by wire.

The present invention may be applied to a handheld-type information processing apparatus (handheld apparatus) that includes a display section, for example. In this case, the pointer displayed on the display section moves when the user moves a main body of the handheld apparatus. Examples of the handheld apparatus include a PDA (Personal Digital Assistance), a cellular phone, a portable music player, and a digital camera.

In the above embodiments, the pointer 2 that moves on the screen in accordance with the movement of the input apparatus 1 has been represented as an image of an arrow. However, the image of the pointer 2 is not limited to the arrow and may be a simple circle, square, or the like, or a character image or any other images.

The detection axes of each of the angular velocity sensor unit 15 and the acceleration sensor unit 16 of the sensor unit 17 do not necessarily need to be mutually orthogonal like the X' axis and the Y' axis described above. In this case, the accelerations respectively projected in the mutually-orthogonal axial directions can be obtained by a calculation that uses a trigonometric function. Similarly, the angular velocities about the mutually-orthogonal axes can be obtained by a calculation that uses the trigonometric function.

Descriptions have been given on the case where the X' and Y' detection axes of the angular velocity sensor unit 15 and the X' and Y' detection axes of the acceleration sensor unit 16 of the sensor unit 17 described in the above embodiments match. However, those detection axes do not necessarily need to match. For example, in a case where the angular velocity sensor unit 15 and the acceleration sensor unit 16 are mounted on a substrate, the angular velocity sensor unit 15 and the acceleration sensor unit 16 may be mounted while being deviated a predetermined rotation angle within a main surface of the substrate so that the detection axes of the angular velocity sensor unit 15 and the acceleration sensor unit 16 do not match. In this case, the accelerations and angular velocities with respect to the respective axes can be obtained by a calculation that uses the trigonometric function.

Instead of the angular velocity sensor unit 15, an angle sensor or an angular acceleration sensor may be used. Examples of the angle sensor include a geomagnetic sensor and an image sensor. When triaxial geomagnetic sensors are used, for example, since change amounts of angle values are detected, angular velocity values can be calculated by differentiating the angle values. The angular acceleration sensor is constituted as a combination of a plurality of acceleration sensors, and angular velocity values can be calculated by integrating angular acceleration values obtained by the angular acceleration sensors.

Typically, the buttons 11 and 12 are each a press-type button, and push buttons or capacitance-type touch buttons are used. The button 13 is typically a rotary-type wheel button. However, the operation sections are not limited thereto, and a bar-type operation section that is operated with one end as a fulcrum or a slide-type operation section may be used instead. The operation section includes a built-in switch (not shown) which detects an operation of the user to the operation section and outputs an operation signal. As the switch that outputs an operation signal, an optical sensor or a capacitance sensor may be used.

As the method of calculating the velocity values ($V_x$, $V_y$), in this embodiment, the MPU 50 divides the acceleration values ($a_x$, $a_y$) by the angular acceleration values ($\Delta\omega_\psi$, $\Delta\omega_\theta$) to calculate radius gyrations ($R_\psi$, $R_\theta$) of the movement of the input apparatus 1. In this case, the velocity values ($V_x$, $V_y$) can be obtained by multiplying the radius gyrations ($R_\psi$, $R_\theta$) by the angular velocity values ($\omega_\psi$, $\omega_\theta$). The radius gyrations ($R_\psi$, $R_\theta$) may also be obtained by dividing acceleration change rates ($\Delta a_x$, $\Delta a_y$) by angular acceleration change rates ($\Delta(\Delta\omega_\psi)$, $\Delta(\Delta\omega_\theta)$).

By calculating the velocity values by the calculation method described above, an operational feeling of the input apparatus 1 that matches an intuition of the user can be obtained, and moreover, the movement of the pointer 2 on the screen 3 also accurately matches the movement of the input apparatus 1.

It should be noted that the velocity values ($V_x$, $V_y$) do not always need to be calculated by the calculation method above. For example, it is also possible for the MPU 50 to adopt, for example, a method of calculating the velocity values ($V_x$, $V_y$) by integrating the acceleration values ($a_x$, $a_y$) and using the angular velocity values ($\omega_\psi$, cod as an adjunct for the integration operation. Alternatively, the velocity values ($V_x$, $V_y$) may be calculated by simply integrating the acceleration values ($a_x$, $a_y$). Alternatively, the detected angular velocity values ($\omega_\psi$, $\omega_\theta$) may be used as they are as the velocity values ($V_x$, $V_y$) of the casing. It is also possible to calculate angular acceleration values ($\Delta\omega_\psi$, $\Delta\omega_\theta$) by temporally differentiating the detected angular velocity values ($\omega_\psi$, $\omega_\theta$) and use them as acceleration values of the casing.

The present application contains subject matter related to that disclosed in Japanese Priority Patent Application JP 2008-327698 filed in the Japan Patent Office on Dec. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus for use in switching display among a plurality of display screens, the information processing apparatus comprising:
   a processing section to process information produced by at least one sensor as a result of a user operation, the processing section having an operation frequency; and
   a mode switch section to initiate a switch between a first mode in which a first signal that is based on first information is processed and a second mode in which a second signal that is based on second information is processed, in association with a display screen, the mode switch section being configured to process the first signal for transitioning to a first display screen corresponding to the first mode in response to detection of first information indicating a switch to the first mode, and to process the second signal for transitioning to a second display screen corresponding to the second mode in response to detection of second information indicating a switch to the second mode;

wherein the mode switch section is configured to reduce consumption of power in response to initiating a switch between the first mode and the second mode by modifying an operation frequency of the processing section.

2. The information processing apparatus according to claim 1, in communication with a control apparatus, wherein the mode switch section is to initiate a switch between the first mode and the second mode in response to a first mode switch command transmitted to the information processing apparatus.

3. The information processing apparatus according to claim 2, further comprising a response section to output to the control apparatus a response signal for notifying that the first mode switch command has been acquired.

4. The information processing apparatus according to claim 1, in communication with a control apparatus, wherein the mode switch section is to initiate a switch between the first mode and the second mode in response to a second mode switch command input by the user, and wherein the mode switch section is to transmit to the control apparatus a signal for making a switch between the first display screen corresponding to the first mode and the second display screen corresponding to the second mode.

5. The information processing apparatus according to claim 1, wherein the mode switch section is to control an on/off operation of the at least one sensor.

6. The information processing apparatus according to claim 5, wherein the at least one sensor includes a plurality of sensors, the operations of which can be controlled individually to be turned on/off, and wherein the mode switch section is to individually control on/off of the operations of the plurality of sensors.

7. The information processing apparatus of claim 1, wherein the mode switch section is further configured to reduce consumption of power by initiating one or more of a plurality of actions which comprises causing one or more sensors of the at least one sensor to be powered down, modifying a rate at which information is transmitted, and modifying a power supply voltage.

8. The information processing apparatus according to claim 7, wherein:

the mode switch section is configured to switch the operation frequency of the processing section from a first value to a second value, smaller than the first value, in response to a switch from the first mode to the second mode; and the mode switch section is configured to switch the operation frequency of the processing section from the second value to the first value in response to a switch from the second mode to the first mode.

9. The information processing apparatus according to claim 1, comprising a handheld apparatus.

10. The information processing apparatus according to claim 1, in communication with a control apparatus, wherein the mode switch section is to initiate a switch between the first mode for transmitting to the control apparatus a first signal that is based on first information, and the second mode for transmitting to the control apparatus a second signal that is based on second information.

11. The information processing apparatus according to claim 10, comprising an input apparatus, wherein the processing section is to process information produced by the at least one sensor as a result of an operation using the input apparatus.

12. The information processing apparatus according to claim 10, in communication with an input apparatus, wherein the mode switch section is to initiate a switch to the first mode in response to receiving the first signal based on first information from the input apparatus, and to the second mode in response to receiving the second signal based on second information from the input apparatus.

13. A control method for an information processing apparatus capable of communicating with a control apparatus capable of switching display among a plurality of display screens, the method comprising acts of:

(A) processing information produced by at least one sensor as a result of a user operation; and (B) initiating a switch between a first mode in which a first signal that is based on first information is processed and a second mode in which a second signal that is based on second information is processed, in association with a display screen, the switch comprising processing the first signal for transitioning to a first display screen corresponding to the first mode in response to detection of first information indicating a switch to the first mode, and processing the second signal for transitioning to a second display screen corresponding to the second mode in response to detection of second information indicating a switch to the second mode;

wherein the act (B) comprises reducing consumption of power, in response to initiating a switch between the first mode and the second mode, by modifying a frequency at which the information produced by the at least one sensor is processed.

* * * * *